US008365235B2

(12) United States Patent
Hunt et al.

(10) Patent No.: US 8,365,235 B2
(45) Date of Patent: Jan. 29, 2013

(54) TRICK PLAY OF STREAMING MEDIA

(75) Inventors: Neil D. Hunt, Mountain View, CA (US);
Timothy Twerdahl, Los Altos, CA (US);
Marcelo Traverso M., San Jose, CA
(US); Douglas Shannon, Mountain
View, CA (US)

(73) Assignee: NETFLIX, Inc., Los Gatos, CA (US)

( * ) Notice: Subject to any disclaimer, the term of this patent is extended or adjusted under 35 U.S.C. 154(b) by 436 days.

(21) Appl. No.: 12/205,118

(22) Filed: Sep. 5, 2008

(65) Prior Publication Data
US 2009/0158326 A1 Jun. 18, 2009

Related U.S. Application Data

(60) Provisional application No. 61/014,745, filed on Dec. 18, 2007.

(51) Int. Cl.
*H04N 7/173* (2011.01)
(52) U.S. Cl. .............................. 725/88; 725/89; 709/219
(58) Field of Classification Search .............. 725/37–61, 725/87–89; 209/217–231
See application file for complete search history.

(56) References Cited

U.S. PATENT DOCUMENTS

| 6,711,741 | B2 * | 3/2004 | Yeo ................................. 725/87 |
| 7,194,687 | B2 * | 3/2007 | Sezan et al. .................... 715/719 |
| 2003/0123853 | A1 * | 7/2003 | Iwahara et al. ................ 386/69 |
| 2004/0197088 | A1 * | 10/2004 | Ferman et al. ................. 386/117 |
| 2005/0050103 | A1 | 3/2005 | Kesteloot et al. |
| 2006/0064716 | A1 | 3/2006 | Sull et al. |

(Continued)

FOREIGN PATENT DOCUMENTS

| EP | 0782085 | 7/1997 |
| EP | 0859365 | 8/1998 |

(Continued)

OTHER PUBLICATIONS

Communication from EP Patent Office, Int'l Appl. No. PCT/US2008/084243, mailed Mar. 17, 2009.

(Continued)

*Primary Examiner* — Annan Shang
(74) *Attorney, Agent, or Firm* — Patterson & Sheridan, LLP

(57) ABSTRACT

A data processing system, comprising a network interface configured to couple to a data network; one or more processors coupled to the network interface; memory coupled to the one or more processors; a video interface coupled to the one or more processors and configured to output video data to a video display device; logic encoded in one or more computer-readable media wherein execution by the one or more processors causes receiving and storing in the memory a plurality of still images from an audiovisual program, wherein each of the still images is associated with a sequentially later time point within the audiovisual program; receiving first user input specifying invocation of a trick play mode of playing the audiovisual program; generating video output to the video interface wherein the video output comprises a first image position comprising one or more of the still images, a linearly second image position comprising one of the still images, and a linearly third image position comprising one or more of the still images; wherein the still images in the video output are arranged in the image positions in sequential order according to time point within the audiovisual program; generating updated video output to the video interface in which the still image of the second image position is shifted into the first image position, one of the still images of the third image position is shifted into the second image position, and one or more new still images are in the third image position.

31 Claims, 16 Drawing Sheets

U.S. PATENT DOCUMENTS

| | | |
|---|---|---|
| 2006/0120692 A1 | 6/2006 | Fukuta |
| 2007/0189719 A1 | 8/2007 | Furumachi et al. |
| 2008/0141317 A1* | 6/2008 | Radloff et al. .................. 725/87 |
| 2008/0313668 A1* | 12/2008 | Setos .............................. 725/32 |

FOREIGN PATENT DOCUMENTS

| | | |
|---|---|---|
| EP | 1251515 | 10/2002 |
| EP | 1251515 A1 | 10/2002 |
| JP | 2006-287875 | 10/2006 |
| WO | WO 9834182 | 8/1998 |

OTHER PUBLICATIONS

PCT Search Report dated Aug. 21, 2009 for PCT/US08/084243.

* cited by examiner

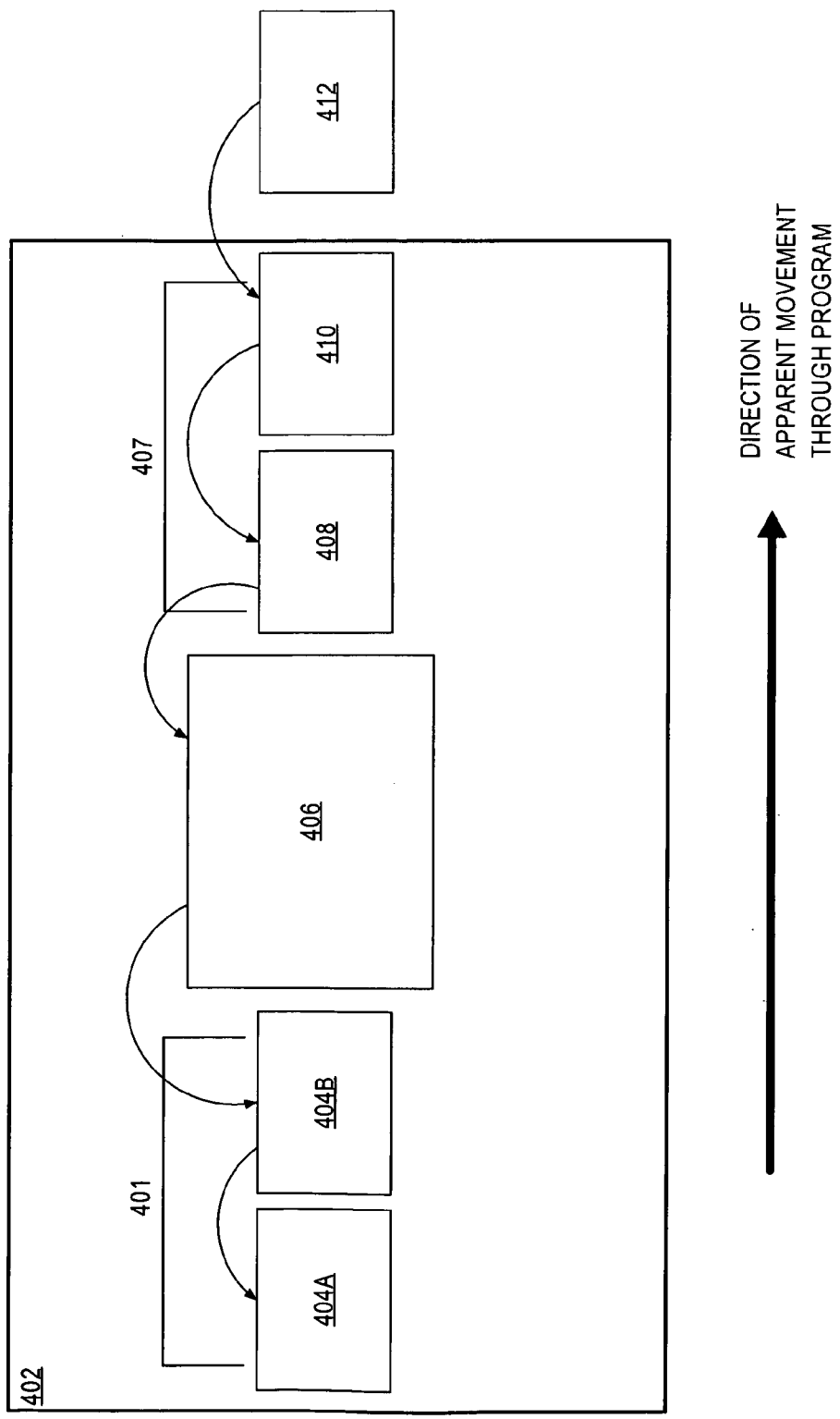

REWIND

TRICK PLAY OF STREAMING MEDIA

BENEFIT CLAIM; CROSS REFERENCE TO RELATED APPLICATIONS

The present application is related to and claims the benefit of provisional application Ser. No. 61/014,745, filed Dec. 18, 2007, entitled "Trick Play of Streaming Media", the entire contents of which is hereby incorporated by reference in its entirety, including any appendices or attachments thereof, for all purposes.

FIELD OF THE INVENTION

The present invention relates to playing streaming media such as streaming video or streaming audio.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2007 Netflix, Inc.

BACKGROUND

Widely available digital media players such as DVD players typically employ fast playback of program material to cue the user during fast forward or fast rewind activities. However, such fast playback often involves a rapid presentation of all or some of the program material in its sped-up form which is difficult for the viewer to digest and comprehend.

Some advanced DVD players move through the program material so fast during fast playback that continuous fast video is impossible, and instead, short fragments of motion are shown for perhaps a second or fraction of a second, while skipping intervening program material until the next fragment is displayed. This involves real-time generation and display of selected frames taken directly from the digital media, and hence requires additional processing power by the media player. Further, such fast playback mode does not offer the user the ability to enter a navigation mode, and then at their leisure step from frame to frame, without feeling pressure to focus intently on the rapidly moving picture in order to arrest motion at the desired point—an activity that may generate anxiety and distract from the enjoyment of watching the program.

DVD movies provide chapter navigation functions in which chapters may be represented in a screen display by still images taken from the DVD program and a user may navigate among the images using a DVD remote control to select a chapter by selecting its associated image. These still images are prepared manually under editorial control and very few (typically less than 20) still images serve as chapter identifiers for the typical DVD movie. Further, the chapter navigation still images often do not represent the video content of a frame at which a chapter actually begins, but are seen at later points in the chapter that are considered representative of the chapter.

In addition to digital media players such as DVDs, streaming media delivery techniques are now widely used for delivery of short video clips, music, and audio files over a data network. However, present techniques for moving rapidly through streaming video files are awkward and inconvenient.

Typically, downloading or launching a streaming media file over a network such as the Internet causes a user's computer to invoke a media player application, such as QuickTime, Windows Media Player, RealAudio, etc. In the media player application, the streaming media file is represented as a slider control typically displayed below a video window or audio visualizer. To move from the beginning of the media file to a point far in the future, the user slides the slider control and waits for the media file to play. However, before starting playback, the media player must download and buffer data of the media file at or just preceding the requested playback point and cannot display the content at or ahead of that point until buffering is complete. Thus, the user normally must wait at least a short time before playback occurs.

Further, the user cannot see ahead into the content in a fast forward operation and cannot rapidly see frames, images or streams of data earlier in a rewind operation; each such operation requires moving the slider, waiting for downloading and buffering, followed by playback at normal speed.

When the entire media file is very large, such as a 2-hour movie, and when the user desires to fast forward to a point 1 hour from the start of the movie, the amount of time involved in receiving and buffering is unacceptably long.

Thus, streaming video and streaming audio protocols do not provide an inherent mechanism for performing "trick play" functions such as fast forward and fast rewind. Each connection of a user device to a media server or other program source has a physical maximum transfer rate, and if a user were to attempt to obtain data at faster than that rate, the server could not deliver data at the requested rate. The data formats used for streaming video and streaming audio do not inherently permit performing fast forward or fast rewind functions, or fast-forward and rewind at different speeds.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Trick play modes for streaming media programs are facilitated using techniques in a data processor that enable simulated fast forward and rewind motion through a streaming media file without requiring the processor to download the entire streaming media file before beginning a trick play mode.

In an embodiment, a data processing system comprises a network interface configured to couple to a data network; one or more processors coupled to the network interface; memory coupled to the one or more processors; a video interface coupled to the one or more processors and configured to output video data to a video display device; logic encoded in one or more computer-readable media wherein execution by the one or more processors causes receiving and storing in the memory a plurality of still images from an audiovisual program, and each of the still images is associated with a sequentially later time point within the audiovisual program; receiving first user input specifying invocation of a trick play mode of playing the audiovisual program; generating video output to the video interface in which the video output comprises a first image position comprising one or more of the still images, a linearly second image position comprising one of the still images, and a linearly third image position comprising one or more of the still images; the still images in the video output are arranged in the image positions in sequential order according to time point within the audiovisual program; generating updated video output to the video interface in which the still image of the second image position is shifted into the first image position, one of the still images of the third image position is shifted into the second image position, and one or more new still images are in the third image position.

In an embodiment, the logic is further operable to generate updated video output to the video interface in which the still image of the second image position is shifted into the third image position, one of the still images of the first image position is shifted into the second image position, and one or more new still images are in the first image position. In an embodiment, the logic is further operable to select the one or more new still images for the third image position of the updated video output by skipping over some of the still images that have been received and stored.

In an embodiment, the first user input specifies a particular movement speed among a plurality of movement speeds, and the logic is further operable to select the one or more new still images for the third image position of the updated video output by skipping over some of the still images that have been received and stored, and the skipping is performed at a rate proportional to the particular movement speed.

In an embodiment, the still image in the second image position is larger than the still images in the first image position and in the third image position. In an embodiment, the logic is further operable to cause requesting the plurality of still images from a streaming media delivery system in response to receiving user input that selects an audiovisual program from among a plurality of available audiovisual programs.

In an embodiment, the logic is further operable to cause discontinuing display of all images of the first image position and all images of the third image position in response to receiving the first user input specifying invocation of a trick play mode of playing the audiovisual program at a rapid rate. In an embodiment, the logic is further operable to perform receiving and storing in the memory the plurality of still images in a first file and receiving and storing in the memory at least a portion of a streaming file representing the audiovisual program. In an embodiment, the logic is further operable to perform the receiving and storing the plurality of still images in response to receiving user input that selects the audiovisual program from among a plurality of available audiovisual programs that are displayed in a list.

In an embodiment, a data processing system comprises a network interface configured to couple to a data network; one or more processors coupled to the network interface; memory coupled to the one or more processors; a video interface coupled to the one or more processors and configured to output video data to a video display device; logic encoded in one or more computer-readable media wherein execution by the one or more processors causes receiving first user input selecting an audiovisual program that comprises a plurality of episodes; generating video output to the video interface in which the video output comprises a linearly arranged set of icons representing a plurality of the episodes in a sequential order, and a particular icon representing a particular episode that was most recently watched is displayed in a center of the set.

In an embodiment, each icon that is associated with a previously watched episode comprises a marking indicating that the episode was watched. In an embodiment, the particular icon further comprises an operation icon representing a playback operation and which when selected causes requesting, receiving and displaying streaming video data of the particular episode. In an embodiment, the sequential order is an order in which the episodes originally aired.

In an embodiment, the logic is further operable to perform generating the video output to the video interface in which the video output comprises a first image position comprising one or more of the icons, a linearly second image position comprising the particular icon, and a linearly third image position comprising one or more of the icons; receiving user input specifying selection of a different icon representing a different episode that is later in the order; generating updated video output to the video interface in which the particular icon is shifted into the first position, one of the icons of the third position is shifted into the second position, and one or more icons representing different episodes that are later in the order are in the third image position.

In an embodiment, the logic is further operable to perform generating the video output to the video interface in which the video output comprises a first image position comprising one or more of the icons, a linearly second image position comprising the particular icon, and a linearly third image position comprising one or more of the icons; receiving user input specifying selection of a different icon representing a different episode that is earlier in the order; generating updated video output to the video interface in which the particular icon is shifted into the third position, one of the icons of the first position is shifted into the second position, and one or more icons representing different episodes that are earlier in the order are in the first image position.

In an embodiment, the logic is further operable to perform generating the video output further including a textual summary of the particular episode associated with the particular icon.

In an embodiment, a data processing system comprises a network interface configured to couple to a data network; one or more processors coupled to the network interface; memory coupled to the one or more processors; a video interface coupled to the one or more processors and configured to output video data to a video display device; logic encoded in one or more computer-readable media wherein execution by the one or more processors causes: receiving and storing in the memory a plurality of still images from an audiovisual program, wherein each of the still images is associated with a sequentially later time point within the audiovisual program; receiving first user input specifying invocation of a trick play mode of playing the audiovisual program; generating video output to the video interface wherein the video output comprises one or more image positions, each image position comprising one of the still images; generating updated video output in which each still image at each of the one or more image positions is replaced with a sequentially adjacent still image of the plurality of still images.

BRIEF DESCRIPTION OF THE DRAWINGS

In the drawings:

FIG. 4B illustrates movement of the still images of FIG. 4 in a fast forward operation.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 System Overview

Figure 1:
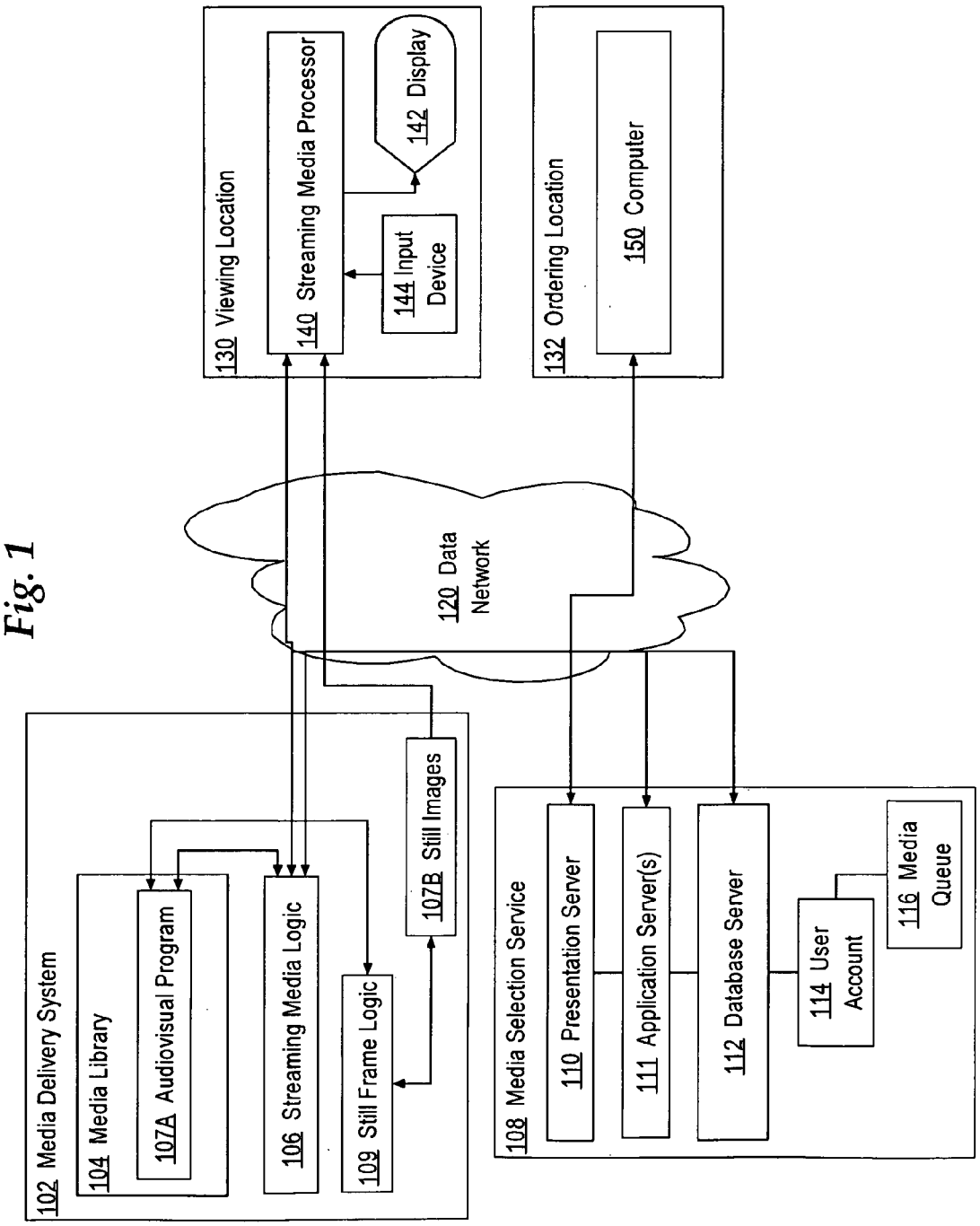
FIG. 1 illustrates a media delivery system, media selection service, viewing location, and ordering location.

FIG. 1 illustrates a media delivery system, media selection service, viewing location, and ordering location. In an embodiment, a media delivery system 102, media selection service 108, streaming media processor 140, and computer 150 are coupled to a data network 120. The data network 120 comprises any of a local area network, wide area network, or one or more internetworks such as the public internet.

In an embodiment, media delivery system 102 comprises a media library 104 that comprises audiovisual programs 107A. Audiovisual program 107A comprises a stored streaming media file, or set of files, that can be delivered on demand over a network connection to a computer such as streaming media processor 140. In a practical embodiment, there may be thousands of audiovisual programs stored in or managed by the media delivery system 102. The term "audiovisual program" as used herein refers broadly to any audio, video, or audiovisual information that can be delivered using a streaming media protocol over a data network. Examples of audiovisual programs include music, recordings of spoken words, movies, sports programs, television series episodes, documentary motion pictures, instructional programs, or any other form of program.

Media delivery system 102 further comprises streaming media logic 106 coupled to the media library 104. The streaming media logic 106 generally is configured to retrieve a selected or specified streaming media file from the media library 104 and deliver the streaming media file using a streaming media protocol to the viewing location 130. For example, streaming media logic is configured to deliver the audiovisual program 107A using HTTP progressive downloading through network 120 to streaming media processor 140.

Media delivery system 102 further comprises still frame logic 109, which is coupled to the media library 104. The still frame logic 109 is configured to retrieve an audiovisual program 107A and to generate and store a plurality of still images 107B based on still frames derived from the program.

In an embodiment, about 360 to 720 still images 107B are stored for a particular audiovisual program 107A, although other embodiments may store any number of still images ranging from a few to thousands depending on the length of the program, the desired "granularity" for trick play modes, and the amount of available memory. The number of the still images 107B may be determined by selection criteria that the still frame logic 109 receives as input. In an embodiment, a relatively dense set of hundreds of still images are used.

The locations in the audiovisual program 107A from which the still images are taken also may be determined based on selection criteria. For example, the still images may be taken at chapter break points within the program 107A. Alternatively, the still images may be sampled from the program 107A at ten-second intervals, or any other time points within the program, or may be otherwise obtained from a plurality of points that are distributed throughout the program. In another alternative, regular time points are used, but the time points that are closest to chapter break points are aligned on the chapter break points. In this context, chapter break points refer to chapter start points in a version of the program 107A that is distributed on disc media such as digital versatile disc (DVD), HD-DVD, Blu-ray disc, etc. Different selection criteria may be used for different audiovisual programs.

Typically the stored still images 107B are formatted using a still image file format that is different from a file format of the program 107A. For example, the program 107A may be a Motion Picture Experts Group (MPEG) version 2 (MPEG-2) file, MPEG-4 file, or other video format, and the still images 107B may be Joint Photographic Experts Group (JPEG) files, Graphics Interchange Format (GIF) files, bitmap image (BMP) files, etc. In an embodiment, when all images in a plurality of individual still images have been generated for a particular audiovisual program 107A, the plurality is collectively stored in a single archive file, such as a ZIP file. Thus, still images 107B in FIG. 1 may represent a plurality of individual images or files, or a single file that collectively stores multiple images.

The still frame logic 109 may run as a thread, background process, task or job that is independent from the streaming media logic 106. In an embodiment, still frame logic 109 is a separate process that runs in an ongoing or continuous manner to generate still images 107B for a large number of audiovisual programs in the media library 104. Media library 104 may be dynamic such that new audiovisual programs 107A are introduced from time to time, and in such an environment the still frame logic 109 may be structured as a daemon or other process that is triggered by the storage of a new program 107A in the media library 104. In response, the daemon wakes up, runs on the new program 107A, and generates and stores a new set of still images 107B for various points within the new program.

Media selection service 108 comprises a presentation server 110, one or more application servers 111, and a database server 112. The media selection service 108 may be integrated into or co-located with the media delivery system 102 as a single system, and the media delivery system may be implemented as an application on the application servers 111 or otherwise contained within the media selection service 108. In the media selection service 108, the one or more application servers 111 are coupled to the presentation server 110 and database server 112 and are configured with logic which when executed performs the functions that are further described herein for streaming media processor 140 and/or computer 150.

The database server 112 maintains a user account 114 for a user of the service including a media queue 116. The user account 114 is associated with a user of the ordering location 132 and the viewing location 130. The database server 112 is configured with an inventory of audiovisual programs that are available for delivery using the media delivery system 102. Application servers 111 and database server 112 is coupled through network 120 to streaming media logic 106 and other elements of media delivery system 102, to enable the media delivery system to determine which audiovisual programs are in media queue 116 for delivery to the viewing location 130. The presentation server 110 is configured with programs for generating a user interface display, receiving user input selecting audiovisual programs for rental or viewing, and other functions.

The media queue 116 comprises a list of audiovisual programs that a particular user or user account has rented or requested for download or viewing. The queue 116 may be an ordered list. The queue 116 may comprise a blended queue that includes both tangible media for rental, such as DVD titles, and audiovisual programs for instant watching or downloading. Media queue 116 also may represent multiple associated queues, so that the service 108 may maintain one queue of tangible media for rental and a separate but associated queue of audiovisual programs for instant watching or downloading. Further, one user account 114 may be associated with multiple user profiles each having a separate queue in any of the foregoing queue arrangements. In an embodiment, the media selection service 108 is the Netflix® service commercially available from Netflix, Inc., Los Gatos, Calif.

Viewing location 130 comprises the streaming media processor 140, an input device 144, and a display 142. For purposes of illustrating a clear example, FIG. 1 shows one viewing location 130, but in a practical embodiment there may be many thousands of viewing locations concurrently served by one or more media delivery systems 102.

In an embodiment, streaming media processor 140 is a computer configured as a set-top box and comprising a processor, volatile memory such as RAM, a network interface configured to couple to the data network 120, a video interface configured to generate video output for display 142, an input interface configured to receive data input and commands from input device 144, and logic stored in non-volatile memory (such as flash memory) configured to perform the functions that are described further herein. In another embodiment, streaming media processor 140 is a general-purpose computing device such as a laptop computer, desktop computer, mobile phone, or mobile data device comprising a media player application configured to perform the functions that are described herein.

The streaming media processor 140 is configured to enable a user to stream movies or other video programs directly from networked servers on the Internet to a television or video monitor and to display the video programs using the full screen capabilities of the television or monitor. In an embodiment, the volatile memory of media processor 140 is capable of storing about one to five minutes of buffered video data. The buffered video data represents full-screen motion picture or video images according to NTSC, PAL, ATSC or other standards for conventional video, HD video, or other formats.

In other embodiments, the buffered video data represents media player application video images according to MPEG, MPEG-2, MPEG-4, or other standards for digitally encoding video. In operation when a movie or other long audiovisual program 107A is played the memory essentially stores a rolling window or circular buffer for a few minutes of the program but typically the entire program is not downloaded and stored because too much memory would be required. While the media processor 140 is playing that amount of video data, the media processor concurrently downloads more data for a program to continuously fill the buffer until the entire program is played. Other embodiments may use more or less memory and some embodiments may use non-volatile memory for data storage such as disk storage.

In an embodiment, input device 144 is a remote control device that uses infrared light-emitting diode emissions to communicate with processor 140. Input device 144 comprises one or more control buttons for operating functions of the streaming media processor 140. For example, input device comprises a forward button, a back button, and a selection button. In another embodiment, input device 144 is a keyboard for communicating information to media processor 140 and/or a cursor control device such as a mouse for communicating direction information and command selections to media processor 140 and for controlling cursor movement on display 142. Keys on the keyboard or buttons on the cursor control device may be designated to invoke the trick play functions, as further described herein. For example, a user may use a mouse to select and drag the slider of a media player application thereby invoking a forward or back trick play mode depending on the direction the slider is moved. As another example, the user may use a mouse to select virtual forward and back buttons provided by a user interface of the media player application. In an embodiment, display 142 comprises a television monitor or other video display.

In this arrangement, the logic in the processor 140 can establish a network connection to media delivery system 102 and can issue commands to the media delivery system to obtain data relating to a user account 114, including the identity of audiovisual programs that are in the media queue 116 for the user, a streaming media file representing an audiovisual program 107A that is in the media queue, the still images 107B, and other information for display to the user.

Ordering location 132 comprises a computer 150 that can connect to presentation server 110 through data network 120. For purposes of illustrating a clear example, FIG. 1 shows one ordering location 132, but in a practical embodiment there may be many thousands of ordering locations concurrently served by one or more media selection services 108. In an embodiment, computer 150 is configured with a browser or other interface program that can connect to a complementary web browser or other server program to interact with functions provided by media selection service 108. The ordering location 132 and the viewing location 130 may be the same location or different locations in various embodiments.

Figure 3:
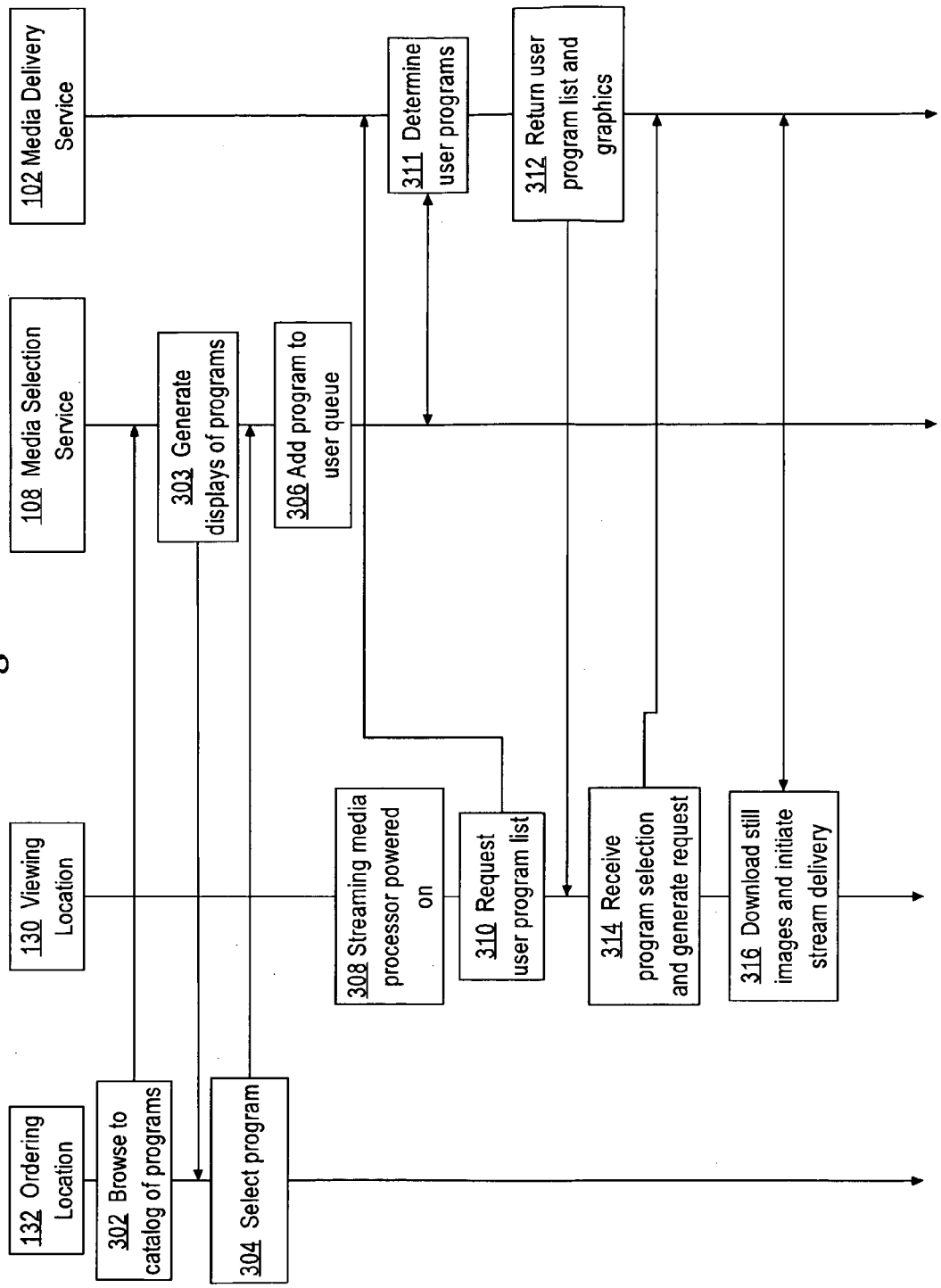
FIG. 3 illustrates a process of delivering still images for an audiovisual program as part of playing a streaming audiovisual program.

Operation of the system of FIG. 1 generally proceeds as follows, in one embodiment. FIG. 3 illustrates a process of delivering still images for an audiovisual program as part of playing a streaming audiovisual program. At step 302, the ordering location browses to a catalog of programs. For example, a user who is a subscriber or other customer of the media selection service 108 uses computer 150 at ordering location 132 to connect to the presentation server 110 through network 120.

The presentation server 110 interoperates with application servers 111 to determine and provide to the computer 150 data representing a catalog of available audiovisual programs. As indicated in step 303, one or more displays of programs may be generated. For example, a web browser in computer 150 can connect to a web server in presentation server 110 and receive web pages that display available audiovisual programs or allow searching a database of audiovisual programs that is maintained in database server 112.

At step 304, a program is selected at the ordering location 132. For example, the user selects a particular audiovisual program and uses functions of the presentation server 110 to add the selected audiovisual program to the user's media queue 116, as shown in step 306.

At step 308, a streaming media processor is powered on at the viewing location 130. For example, the user activates the streaming media processor 140 at the viewing location 130. The processor 140 automatically establishes a network connection through data network 120 to streaming media logic 106 and requests information about what programs are in the media queue 116, as indicated at step 310. Step 310 may represent a periodic polling operation by the streaming media processor 140. At step 311, the streaming media logic 106 sends a query to database server 112, obtains the information, and provides the information to the processor 140 at step 312. The information may comprise an encoded program list, graphics, or other data. In an embodiment, the information is provided in an XML document, HTML, or other encoded format. Alternatively, processor 140 can connect directly to media selection service 108 and obtain the information from the database server.

In step 314, the viewing location 130 receives a program selection and generates a request for the selected program. For example, the processor 140 displays a menu of available programs on display 142. The user provides input using input device 144 to select one of the programs for viewing. Assume that audiovisual program 107A is selected.

In response, processor 140 requests the still images 107B that correspond to the selected audiovisual program 107A, as shown in step 316. Still frame logic 109 provides the still images 107B via network 120 to the processor 140, which extracts the still images from an archive file if necessary and stores the still images in memory. Also in response to selection of audiovisual program 107A, processor 140 requests the selected audiovisual program 107A and initiates stream delivery of audiovisual program 107A as indicated at step 316. Processor 140 may initiate stream delivery of audiovisual program 107A either concurrently or sequentially with respect to processor 140 requesting still images 107B.

Streaming media logic 106 initiates a streaming data transfer of a data file representing the audiovisual program 107A and sends the data to the processor 140, which converts the streaming data to video output and displays the video output on display 142. Still images 107B may be received at viewing location 130 near the time that the processor 140 initiates streaming the associated movie or other program 107A. Alternatively, still images 107B may be received after the user has initiated a forward or backward navigation action. In one embodiment, individual still images of still images 107B are received just-in-time as they are needed by processor 140. The individual still images may be cached in a local memory, according to a rule or predictive algorithm.

Using this approach, a user can build, using a computer connected to a networked server, a queue of programs for instant viewing. At the ordering location or a different location, the user can use a streaming media processor to retrieve a queued program for viewing using streaming media protocols. Further, a set of still images associated with the audiovisual program are automatically generated, retrieved and stored at the media processor for use in trick play functions, as further described herein.

2.0 Trick Play of Streaming Media

2.1 Generating Still Images from a Program

Figure 2:
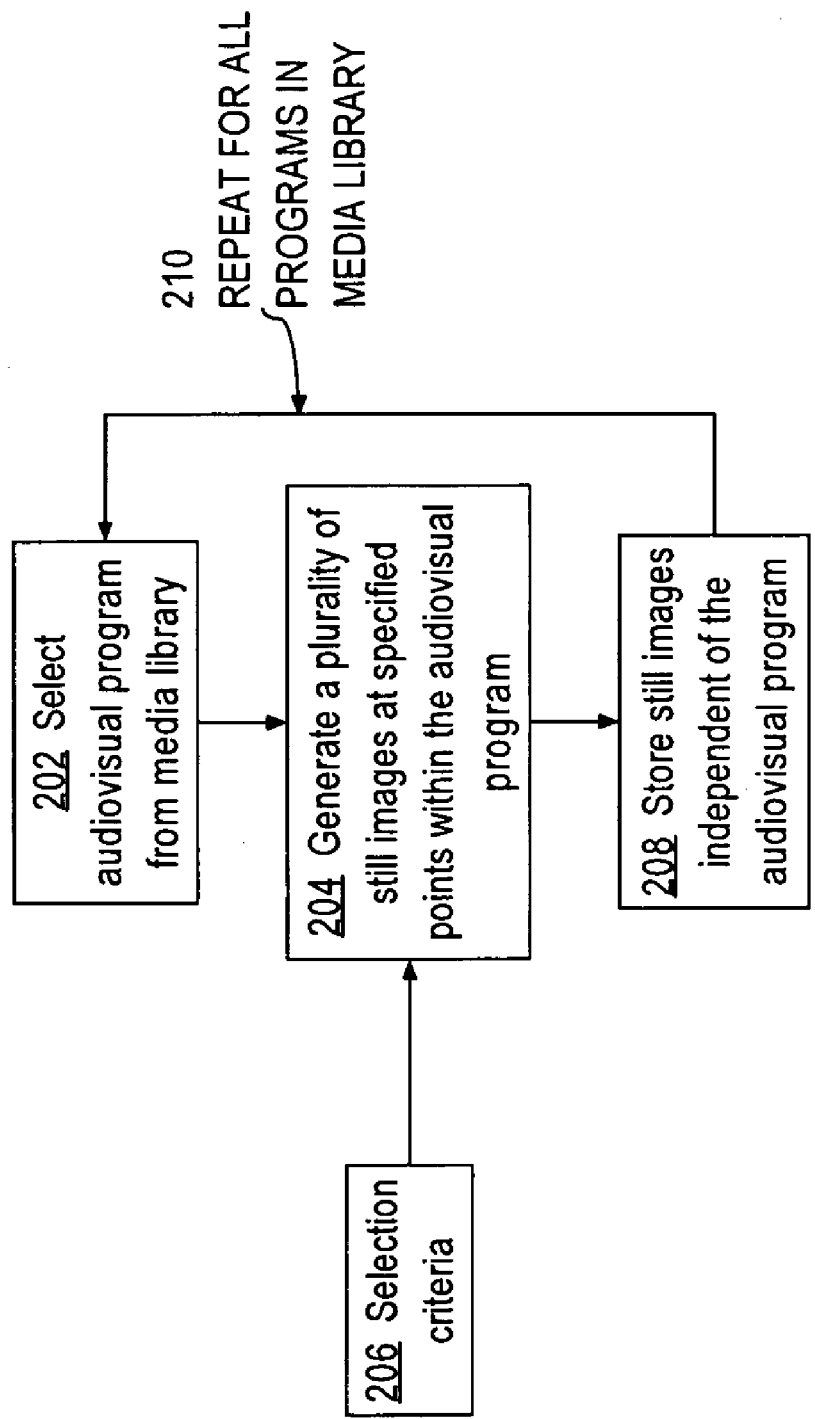
FIG. 2 illustrates generating still images for an audiovisual program.

FIG. 2 illustrates generating still images for an audiovisual program. FIG. 2 represents steps that are performed at media delivery system 102 in an off-line process or preparatory process to generate still images derived from frames of an audiovisual program for later use by one or more media processors as part of trick play functions. In an embodiment, a screen grab program such as Image Magick is used, with appropriate parameter settings and under control of a script, to implement FIG. 2. Image Magick is commercially available from the online site imagemagick.org.

In an embodiment, in step 202 an audiovisual program is selected from a media library that contains many different audiovisual programs. For example, a daemon or other software process implementing the method of FIG. 2 selects a program from media library 104 that has been recently added, or is next for consideration in order based on an identifier, date/time value, etc. The particular mechanism used for selection is not critical and the method is broadly intended to represent successively selecting each program in the media library 104 using any suitable criteria until all programs have been selected and processed.

In step 204, a plurality of still images are generated based on specified points within the audiovisual program. Each of the still images typically is a still frame from the audiovisual program at a particular instant. In an embodiment, generating a still image includes storing metadata in association with the still image. Metadata comprises a timestamp representing a position within the audiovisual program from which the still image was obtained so that later playback operations can resume at the correct point when a user exits a trick play mode.

Generating the still images may be directed or driven by selection criteria 206. The selection criteria may comprise programmatic rules or datasets that drive selection of frames. Examples of selection criteria include: generate a still frame at each chapter break point of a disc media version of the program; generate a still frame every N seconds during the duration of the program, in which N is configurable; perform both of the foregoing and align the still frames that are selected at time points to the chapter break points.

In an embodiment, the still images are generated based on playing the audiovisual work at a specified point and generating or saving a screen capture or conversion of a still frame of a video image that is displayed at the specified point. For example, a JPEG file of a freeze frame at a particular point is created and stored.

If a particular audiovisual program is not in a format that can be delivered using a streaming media protocol, then step 204 also may comprise generating a data file that can be delivered using the streaming media protocol. For example, if the program is recorded on DVD, step 204 can comprise creating a copy of a data file on disk storage for future delivery using a streaming media protocol to any of thousands of requesting processors.

In step 208, the still images are stored independent of the audiovisual program. For example, an archive of all still images for a particular program is created and stored as an archive file. Alternatively, the still images are stored in an ordered manner, e.g., in a directory or folder. The still images may comprise JPEG images or may use other image formats that permit random access.

As indicated by arrow 210, the process repeats until all programs in the media library have been processed. As a result, for each audiovisual program in the media library, a set of still image files is generated and saved in a manner that can be transferred over a network independent of the audiovisual program.

Optionally, the still images generated in FIG. 2 may be subjected to post-processing. For example, individual images can be cropped or modified to optimize display. For example, identification of the scene depicted in a still image may be enhanced by zooming the image slightly, and discarding the outermost 10% or 20%—leaving the "title-safe" or "action-safe" region of the image visible. When automatic selection of images is performed according to the criteria 206, certain still images may be undesirable for use in trick play modes because the images are blurred, not visually attractive, unintelligible, or for other reasons. These images may be automatically or manually reviewed and replaced after the process of FIG. 2 is performed. Automatic review can include using covariance or other sharpness metrics, or by performing a difference analysis between successive frames of the original video to detect rapid motion or scene changes.

In an embodiment, the steps of FIG. 2 are performed before an audiovisual program is to be played using streaming media, and may be performed days, weeks or months before the program is played. Thus, using the approach of FIG. 2 an audiovisual program essentially may be pre-digested to generate a set of still images that can be later used to implement trick play modes without the need to read data of the audiovisual program at the time of displaying trick play frames. Alternatively, the still images may be generated as needed by the media server or associated processor (using any of the methods previously described), and may be cached at the server for subsequent requests for the still images.

2.2 Performing Fast Forward and Fast Rewind Functions

Figure 4A:
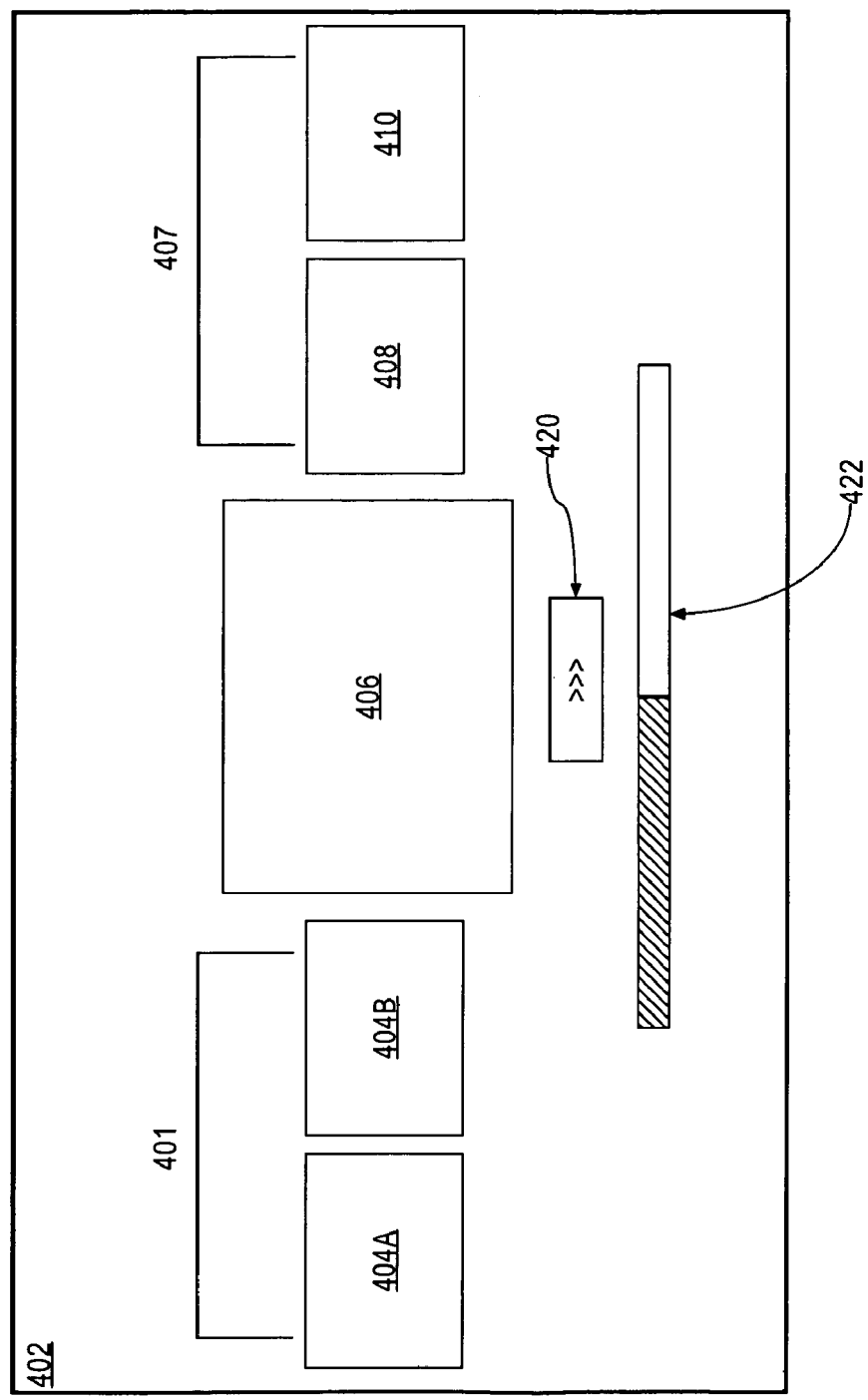
FIG. 4A illustrates a display of multiple still images from an audiovisual program.
Figure 4C:
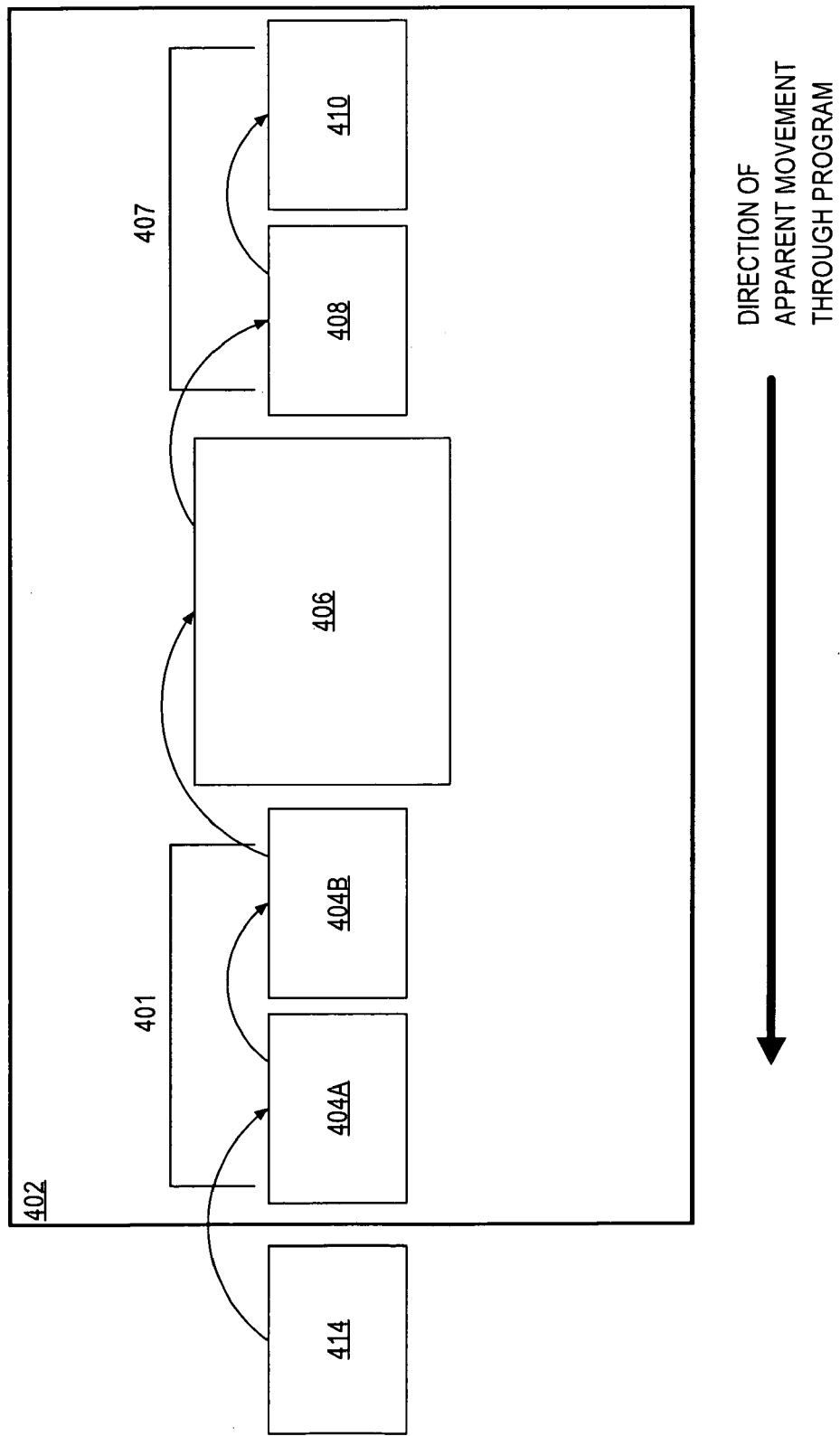
FIG. 4C illustrates movement of the still images of FIG. 4 in a rewind operation.
Figure 9:
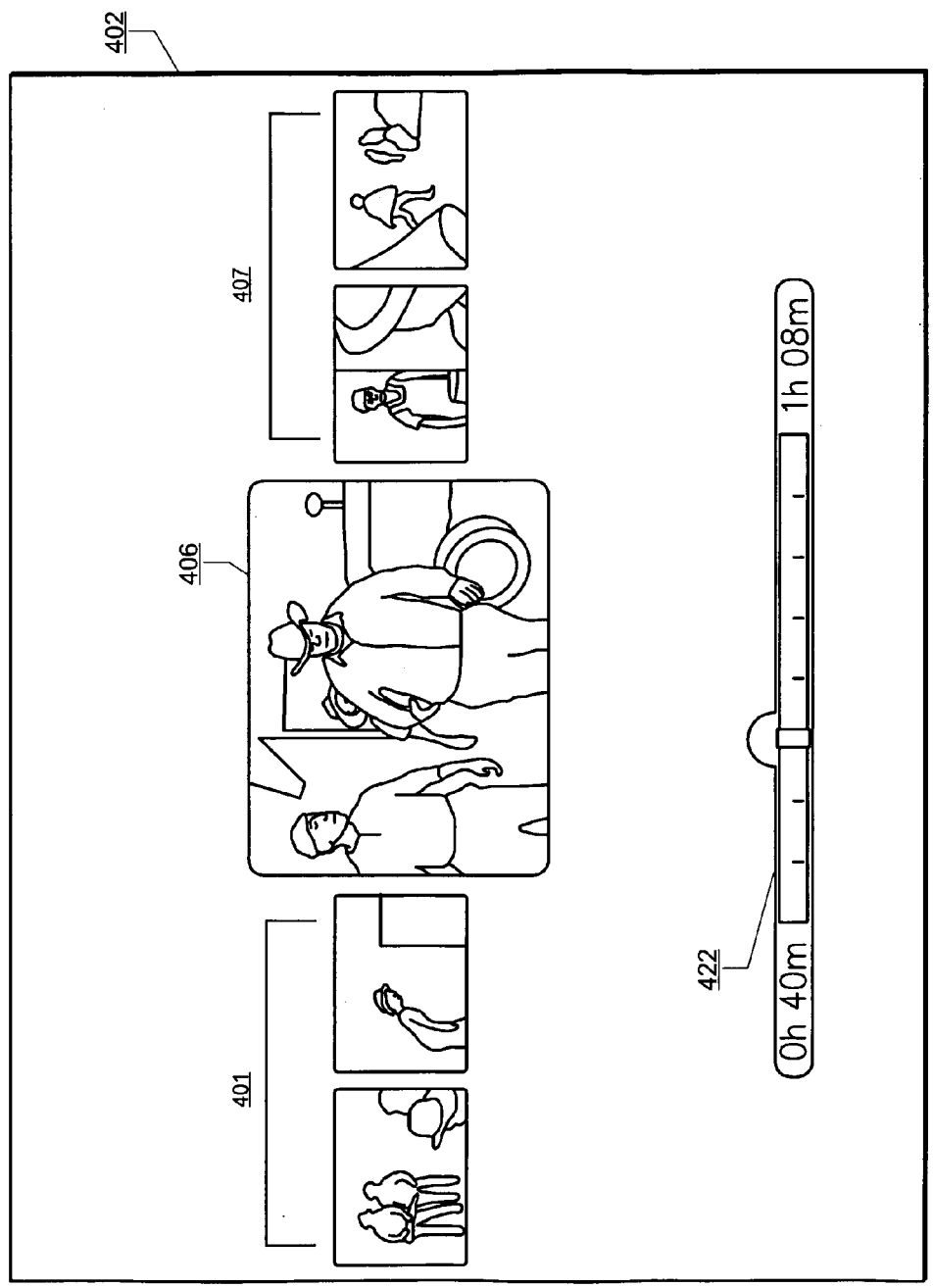
FIG. 9 illustrates a display of two still images in a first image position, one still image in a second image position, and two still images in a third image position, as displayed in a video display for use in trick play of streaming media.
Figure 10:
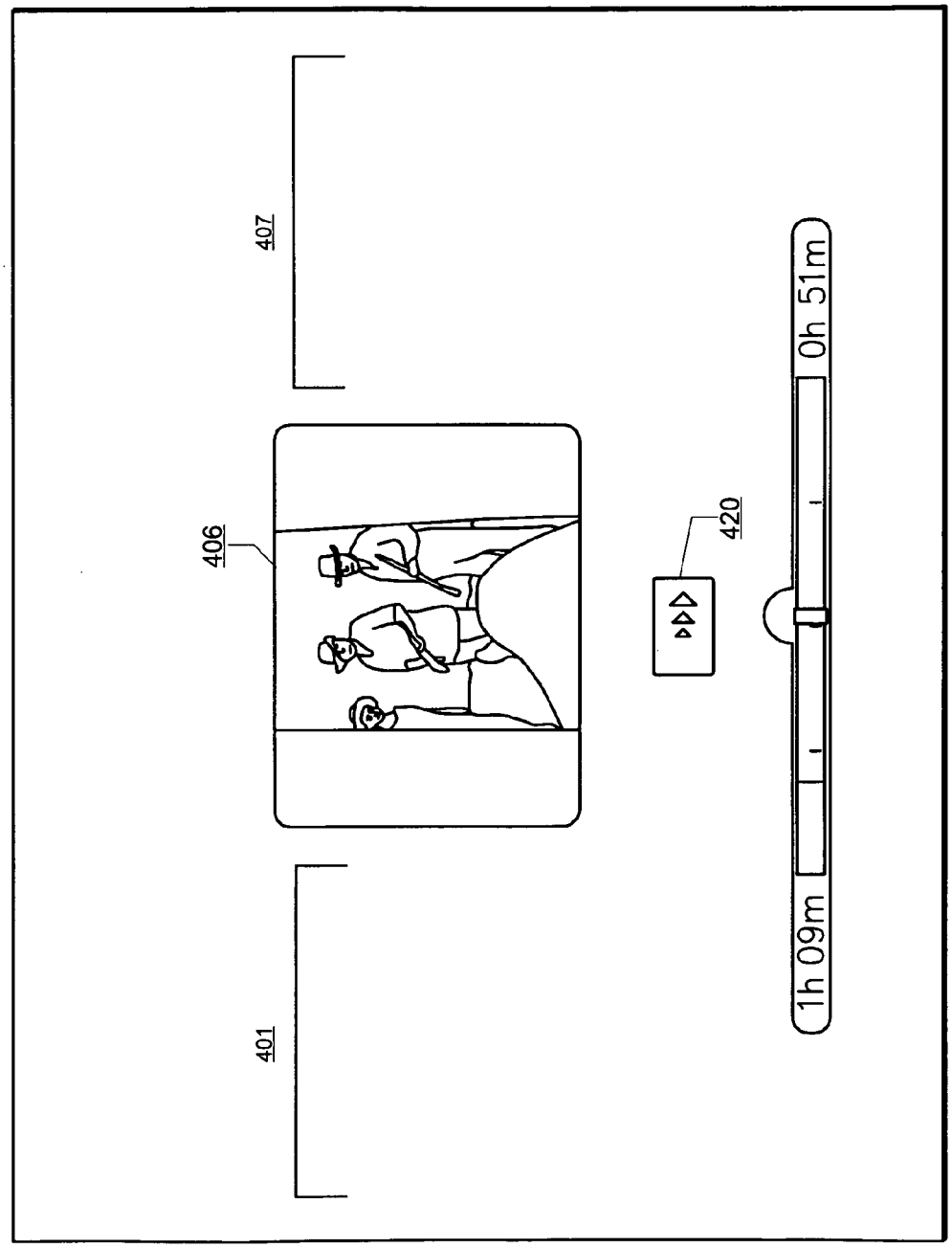
FIG. 10 illustrates the display of FIG. 9 in which the first image position and the third image position have been removed during high speed trick play of streaming media.

FIG. 4A illustrates a display of multiple still images from an audiovisual program. FIG. 4B illustrates movement of the still images of FIG. 4 in a fast forward operation. FIG. 4C illustrates movement of the still images of FIG. 4 in a rewind operation. FIG. 9 illustrates a display of two still images in a first image position, one still image in a second image position, and two still images in a third image position, as displayed in a video display for use in trick play of streaming media. FIG. 10 illustrates the display of FIG. 9 in which the first image position and the third image position have been removed during high speed trick play of streaming media.

Referring first to FIG. 4A, in an embodiment, a screen display 402 on a video monitor or similar device may comprise a first image position 401 comprising one or more still images 404A, 404B, a second image position 406 comprising one still image, and a third image position 407 comprising one or more other still images 408, 410. Image position 401, 406, and 407 display still images that were generated from the audiovisual program. The still images are displayed in sequential order as they appear in the audiovisual program with the first or earliest images in position 401 and last or later images in position 407. The screen display 402 also may comprise a movement icon 420 and a progress bar 422.

In an embodiment, streaming media processor 140 displays screen display 402 in response to user input from input device 144 requesting a trick play function. For example, assume that a user is viewing a movie using the processor 140 and a streaming video protocol and the presses a "fast forward" button on device 144 or selects and drags the slider of a media player application, which generates and sends a fast forward command to processor 140. In response to the fast forward command, processor 140 changes the display 142 to show screen display 402. The processor 140 no longer displays the streaming media but displays a set of still images 107B that have been sampled from the program 107A in the form represented in screen display 402. In an embodiment, a full-screen full-motion display of audiovisual program 107A is changed to screen display 402 which shows five (5) of the still images 107B in successive positions 401, 406, 407. Further, the images in display 402 move successively from right to left as fast forward control proceeds. In one embodiment the streaming video 107A is frozen and the still image or images 107B are overlaid on top of the frozen video, which may be darkened or dimmed to emphasize the overlaid stills.

In one embodiment, media processor 140 displays screen display 402 in response to the user selecting and dragging the slider of a media player application, which generates and sends a forward or rewind command to processor 140 depending on the direction the slider is moved. In response to the forward or rewind command, the media player application replaces or overlays the display of the streaming media with a set of still images 107B representing the content of the program at a time point close to that represented by the position of the slider. Further, images in display 402 may move successively from right to left or left to right as the user continues to drag the slider forward or backward. When the user releases the slider, or pauses dragging the slider for a period of time, the media processor 140 may begin to re-buffer the content at the time point close to that represented by the position of the slider. When a sufficient portion of the media at the new time point is buffered the media processor 140 replaces the displayed still images with playback of the buffered content.

While FIG. 4A illustrates a screen display comprising three images positions 401, 406, and 407, the screen display may comprise more then three image positions or less than three image positions. For example, screen display 402 may comprise a single image position comprising one of the still images. Continuing the example, as a forward or back command is received by media processor 140 the displayed still image is replaced with a sequentially adjacent still image from still images 107B (i.e., the next nearest still image to the time point of the replaced still image in the time direction of the trick-play operation).

Referring now to FIG. 4B, during a fast forward operation, image 404A disappears and appears to have moved off the screen to the left. Image 404B replaces image 404A and concurrently the image in position 406 moves leftward to position 401 to replace image 404B. Image 408 moves leftward into the second position 401. Image 410 moves leftward to replace image 408. A new image 412 from among the previously downloaded still images 107B replaces the image 410. As a result, the user appears to be moving through the program at fast forward speed in the direction indicated by the arrow at the bottom of FIG. 4B. The process, however, does not involve displaying the audiovisual program 407A using a streaming media protocol, but rather involves successively displaying the separately received still images in successively different positions on the screen, and concurrently moving the images to their new positions, to provide an illusion of rapidly moving through the streaming data of the audiovisual program 407A.

In an embodiment, repeated selection of a fast forward button or rewind button on device 144 causes the system to toggle through successive still images and thus the user can rapidly advance at periodic intervals through the program. Alternatively, the same function may be implemented in response to a user pressing and holding a fast forward or rewind button.

In another embodiment, dragging the slider of a media player application causes the system to toggle through successive still images. The rate at which the user drags the slider across the screen can be used by the system to determine the rate of display of successive still images.

Movement icon 420 indicates a speed of fast forward or rewind operation among multiple available speeds. In an embodiment, repeated selection of a fast forward button or rewind button on device 144 causes the system to toggle through successively higher movement speeds for the current trick play mode (fast forward or rewind) until the highest movement speed is reached; selecting the same button again then causes returning to the lowest available movement speed for that trick play mode. As a movement speed changes, the movement icon 420 changes to illustrate the then-current speed.

Further, images move among different positions in screen display 402 at a greater or lesser speed depending on the selected movement speed. In an embodiment, a speed change may be accomplished by selectively skipping certain of the still images 107B and not displaying them so that the program appears to be advancing more rapidly. Alternatively, a speed change may be accomplished by causing certain of the still frames in the first image position or the third image position never to be displayed in the second image position, but to jump directly to the opposite side of the screen into either the first image position or third image position as appropriate. For example, in the arrangement of FIG. 4A, to implement a faster speed still image 408 might move directly to the position of still image 404B or still image 404A, and might never appear in the second position 406. Alternatively, a speed change may be accomplished by changing the amount of time during which each of the still images is displayed on the screen—that is, the presentation time of the images. A combination of two or more of these techniques also may be used.

The rate of display of the still images may be used to give the appearance of faster or slower progression through the program material. For example, if still images have been collected at 10 second program intervals, then displaying one still per second gives the appearance of progressing through the program material at 10 times (10×) the normal viewing speed, displaying every second still image at two-thirds of a second per still gives the appearance of 30× speed, displaying every fourth still image at half second intervals gives the appearance of 80× speed, and so on. Thus, the rate of display of the still images may be used to hint at higher speeds of traversing the program material but does not stress the media processor in the way that displaying all the frames of the program material at the equivalent rate of display would stress the processor. Further, the progression techniques disclosed herein allow the user to easily discern when to stop progressing through the program material. In contrast, displaying all the frames of the program material at the equivalent rate of display often results in a screen image that is too blurry to discern any detail or hint of when to stop progressing through the material.

Progress bar 422 may illustrate a relative amount of the audiovisual program 107A that has been played and may also include one or more markers, such as vertical bars, to indicate relative positions within program 107A of the still images that are shown in display 402. One or more of the still images of display 402 may be indicated in the progress bar. For example, the progress bar 422 may comprise a marker only for the still image in the second image position 406.

Figure 14:
FIG. 14 illustrates an embodiment of a slider control that may be used in a media player application.

In an embodiment, the progress bar is included within a slider component of a media player application. FIG. 14 illustrates an embodiment of a slider control 1400 of a media player application comprising progress bar 422 and slider 1402. Slider 1402 may be used to invoke trick-play operations described herein by selecting and dragging the slider forward or backward using a cursor control device such as a mouse.

In an embodiment, chapter points within audiovisual program 107A are represented using markers on progress bar 422. In an embodiment, as the user drags the slider of a media player application the progress bar "snaps" to the nearest chapter point in the direction the slider is being moved. The progress bar "releases" from the chapter point only after the user has moved the slider sufficiently far away from the marker representing the chapter point. A distinct audio signal may accompany the action of snapping progress bar 422 to a chapter point.

FIG. 4C illustrates movement of the still images of FIG. 4 in a rewind operation. When a rewind trick play mode is selected, the still images in screen display 402 move as indicated above for FIG. 4B but in an opposite direction. For example, a new still image 414 replaces still image 404A in position 401, and image 404A moves rightward to replace image 404B. Concurrently, image 404B moves into the second position 406. The image at second position 406 moves rightward to replace image 408, which moves to replace image 410. The previously displayed image 410 appears to disappear off the screen to the right. As a result, the display appears to be rewinding the audiovisual program to move through the program in the direction indicated by the arrow at the bottom of FIG. 4C.

In an embodiment, each still image that is displayed in the second image position 406 is displayed in a size larger than the size of images in first and third image positions 401, 407. This approach gives the second image position 406 more prominence and gives the user a focal point while still providing the user with image references in the first and third image positions 401, 407 to indicate what came before and what comes next.

FIG. 9 illustrates a display of two still images in a first image position, one still image in a second image position, and two still images in a third image position, as displayed in a video display for use in trick play of streaming media. Each of the still images is, for example, a JPG still graphical image and is not displayed directly from the video stream for the program. In this embodiment, a background portion of the screen display 402 is black, but other background colors may be used in other embodiments. Still images are depicted using an aspect ratio of 3:4, but in other embodiments a ratio of 9:16 or other ratios may be used. In FIG. 9, progress bar 422 comprises a half-circle icon that indicates a relative position of the large still image, of the second image position, within the audiovisual program as a whole. A first time value on one side of the progress bar may indicate the amount of the program that has been viewed and a second time value on another side of the progress bar may indicate the amount of the program that has yet to be viewed.

FIG. 10 illustrates the display of FIG. 9 in which the first image position and the third image position have been removed during high speed trick play of streaming media. In the embodiment of FIG. 10, movement icon 420 indicates three possible speed settings for fast forward trick mode, indicated by three successively larger arrow symbols. The first and second arrow symbols are highlighted indicating that the user has selected the second of the three speed settings. In an embodiment, when a high speed of movement has been selected, the streaming media processor 140 discontinues display of still images in the first image position 401 and the third image position 407 and only displays successively different still images in the second image position 406 in the center of the screen.

In an embodiment, the audio of the program material is silenced during trick-play operations, and when the streaming media processor 140 displays each still image 107B, the processor generates a first specified sound, and when a still image 107B that is associated with a chapter break point in the audiovisual program 107A, the processor generates a distinctive audible sound, or pauses the display, to provide the user with an audible or visual cue that a major point in the program has been reached, and to allow the user an opportunity to resume playback of the program or exit trick play mode. The first specified sound may be a click and the distinctive audible sound may be a bell or bleep, but any combination of sounds may be used. In an embodiment, when a chapter break point is reached the processor 144 pauses the display, and the trick play mode resumes with display of successive still images if no user action is taken after a specified period of time, for example, one-half second.

In an embodiment, a user can exit any of the trick play modes described above by selecting a button on the input device 144, such as by stopping fast-forward or rewind using a pause button on the input device 144 and pausing for greater than a specified time period as measured by the streaming media processor 140. In response, the streaming media processor 140 displays, in full-screen size on the video display, the last still image that was shown with prominence in the trick play mode in the second image position. The streaming media processor 140 concurrently begins downloading and re-buffering streaming data for the current audiovisual program at a position associated with the still image that was last shown in the second image position, then plays the streaming data starting at that point and continues downloading and buffering additional streaming data for the program moving forward from that point. During the downloading and buffering, the processor 140 may display in the video output a message or icon indicating that downloading and buffering is occurring. When downloading and buffering are complete, playback resumes at the specified point. At any point during buffering, the user might resume trick-play activity, in which case the buffering operation is abandoned, until a new playback point is chosen by the user.

The downloading and re-buffering also may begin while the user has paused the trick play mode, in anticipation that the user has found a point at which the user wishes to resume playback. Alternatively, the contents of the buffer memory in streaming media processor 140 are not discarded and new information is not downloaded or buffered until the user has committed to playback at the current paused position by selecting a playback button with the input device 144. In this approach—that is, when the buffer contents are preserved during trick play—in an embodiment, a user may exit any of the trick play modes described above and resume playback at the point where the user left off playback (before entering the trick play mode) by selecting a button on the input device 144, such as an UP button or selection button. In this approach, playback begins at the last point seen by the user and thus playback resumes as if trick play had not occurred. The UP button or another button may serve as an "escape" operator.

Using these approaches, trick play modes may be implemented for streaming media without downloading, buffering and displaying all parts of a media file that exist between a user's current viewing position and another position that is far earlier or later in the program or at a fast-forward or rewind viewing position. Instead, separate still images are displayed and the still images are not part of the media file. Further, the still images are prepared and stored long in advance of the time of playing the streaming media file, and delivered to the playback device as a set at the time that a program is selected for viewing.

3.0 Selecting Programs and Episodes

Techniques similar to the successively moving still images, described above for trick play modes, may be used for other aspects of a user interface in a video display, as now described.

3.1 User Interface for Selecting Audiovisual Programs

Figure 5:
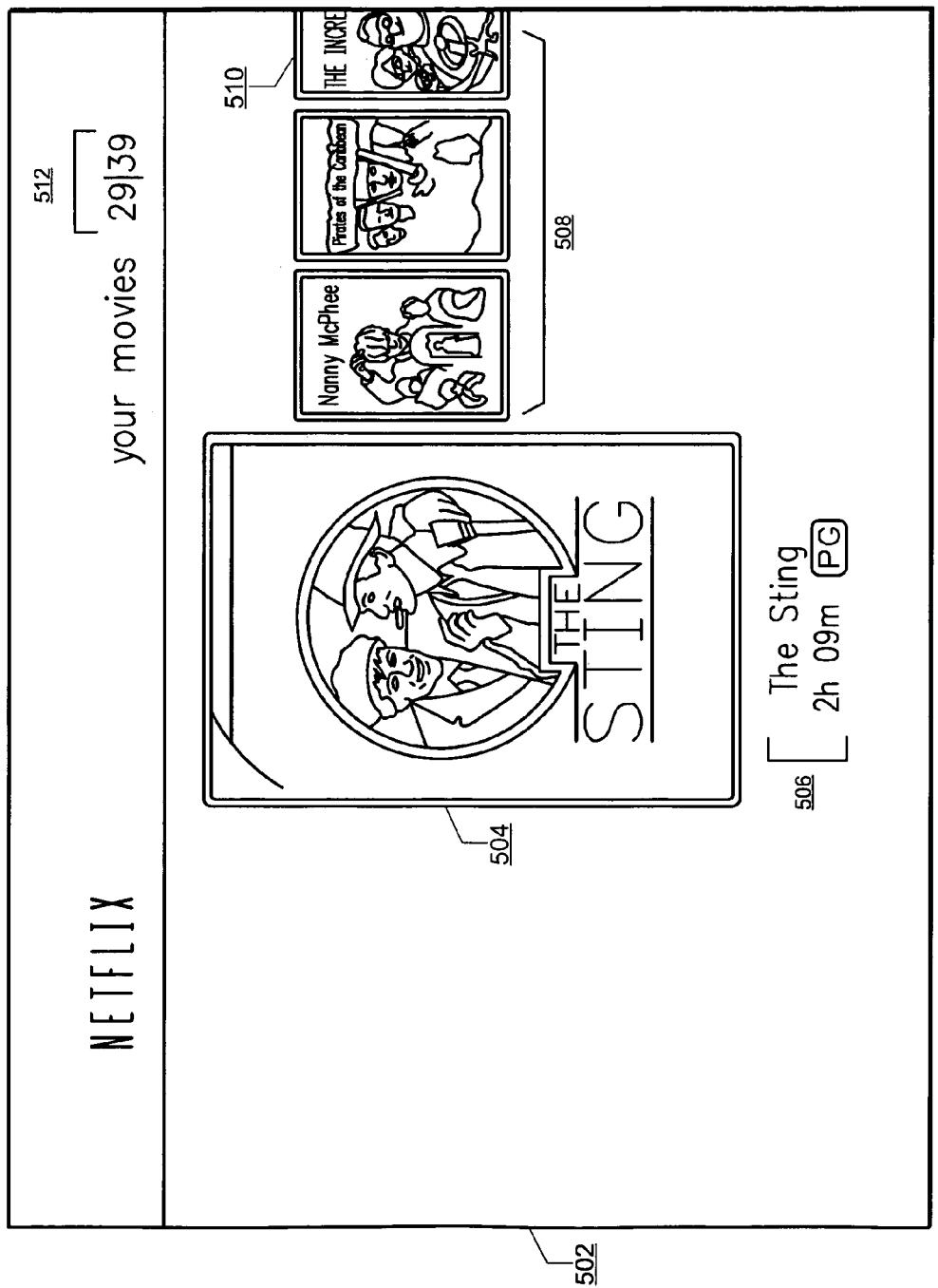
FIG. 5 illustrates a poster screen showing a first audiovisual program title and a set of other audiovisual program titles as displayed on a video display.

In an embodiment, successive still images support the selection of audiovisual programs from among a library or set of available programs. FIG. 5 illustrates a poster screen showing a first audiovisual program title and a set of other audiovisual program titles as displayed on a video display. In an embodiment, the streaming media processor 140 generates screen display 502 for video output in response to a user powering on the processor, or in response to a user making a selection from a user interface in which the user requests to view movies or other audiovisual programs that are available for instant viewing.

In screen display 502, poster image 504 identifies a first movie that is available for instant viewing using streaming media with the streaming media processor 140. The poster image represents cover art for a movie or other program, or other title information. Zero or more other small poster images 508 indicate other programs that are available for viewing and may be arranged in an order of the user's media queue 116 or any other order. Processor 140 may interact with streaming media logic 106 to obtain a list of programs available for viewing and graphical images of the programs, termed "poster images," at the time that the streaming media processor begins operation or during operation. For example, upon power-up and completing bootstrap operations, processor 140 connects to the streaming media logic 106 or other elements of media delivery system 102 or media selection service 108, presents user login information or processor identifying information or other credentials, retrieves a list of programs available to the user, and downloads a set of poster images for those programs.

In an embodiment, at least one small poster image 510 is displayed only in part in screen display 502 to provide the user with a visual cue that other programs exist in the user's list. A quantity message 512 indicates the number of movies available to the user and the ordinal position of the movie that is shown in the large poster image 504. Text 506 specifies a title of the movie, its running time, rating, or other metadata. In various embodiments, the position and content of the quantity message 512 and text 506 may vary.

Figure 6:
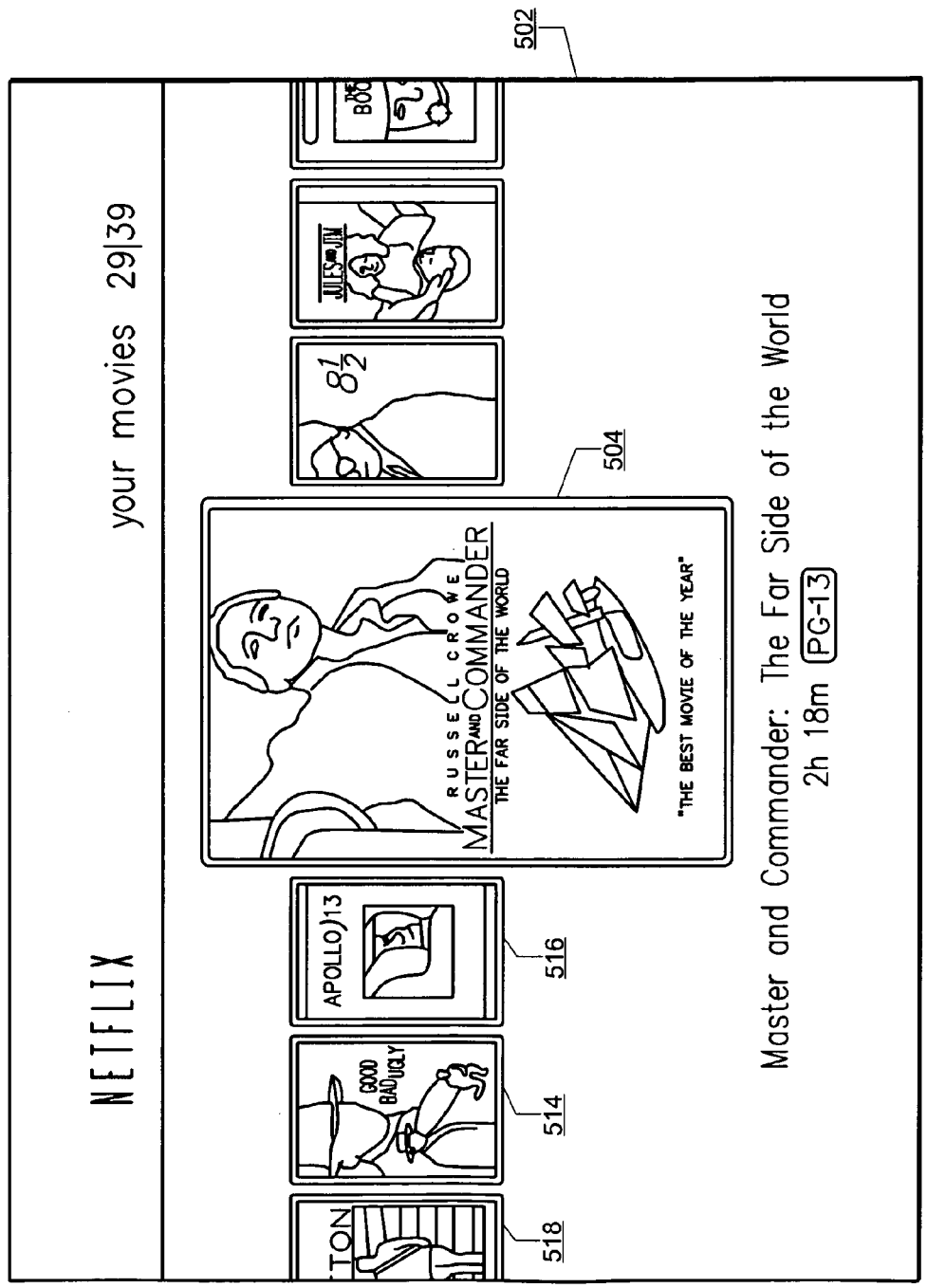
FIG. 6 illustrates the poster screen of FIG. 5 in which the set of audiovisual program titles has shifted and a different title is displayed in the center of the video display.

In an embodiment, a user can view poster images of other movies available to the user for instant viewing using the streaming media processor 140 by operating a movement button or selection button on input device 144. In response, the poster images of screen display 502 move to reveal other available movies to replace the large poster image 506 with an image of a next movie in order. For example, FIG. 6 illustrates the poster screen of FIG. 5 in which the set of audiovisual program titles has shifted and a different title is displayed in the center of the video display. Thus, FIG. 6 may represent a display resulting from the user selecting a rightward movement button on the input device 144 multiple times. In response, large poster image 504 of "The Sting" visually moves to a position indicated by small poster image 516 of FIG. 6, and successive presses of the movement button or continued pressing of the movement button causes that image to continue moving among successive leftward image positions until it appears to move off the screen to the left. Other poster images of other available movies are displayed in the successive image positions.

As a result, the screen display 502 of FIG. 6 may comprise a partial small poster image 518, which provides a visual cue to the user that other movies are available in the list and can be viewed if leftward movement is selected. Display 502 of FIG. 6 also comprises one or more poster images 516 in a first position, a large poster image 514 in a second or center position, and one or more other poster images 518 in a third position. In various embodiments, all poster images may be the same size, or the center poster image or another poster image may be given prominence or highlighting through means other than a larger size. For example, a colored border can be used, or certain images can be brightened or grayed out, etc.

Figure 7:
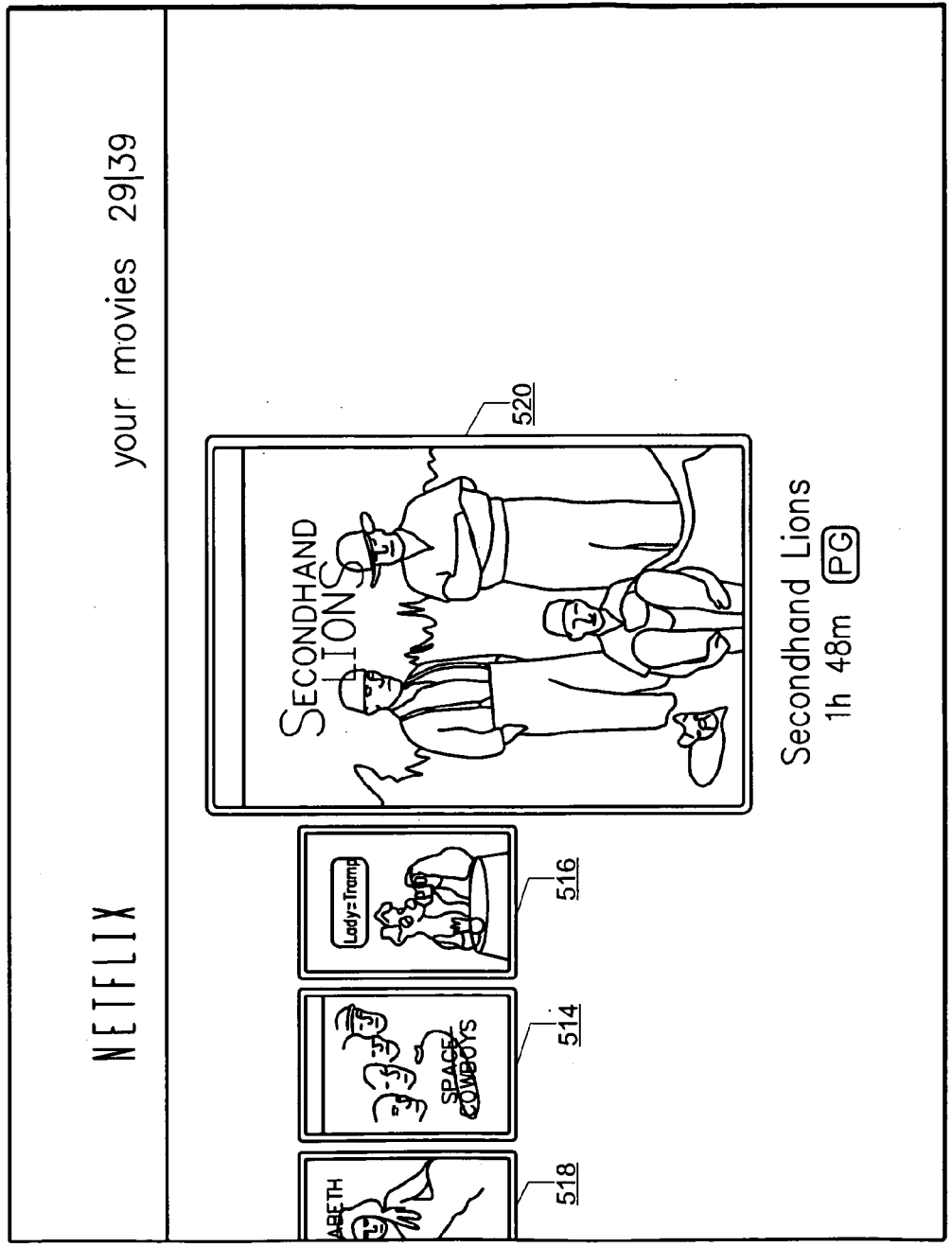
FIG. 7 illustrates the poster screen of FIG. 5 showing the last title in the set of audiovisual program titles.

FIG. 7 illustrates the poster screen of FIG. 5 showing the last title in the set of audiovisual program titles. In this example, a user has scrolled through a list of available movies using successive presses or continued pressing of a rightward movement button of the input device 144. When the end of the list is reached, the last movie in the list is displayed as the large poster image 520 in the center of the screen with no other poster images on the right side, and other available movies are displayed as small poster images 514, 516, and 518 on the left side of the center poster image. Selecting a leftward movement button causes the large poster image 520 to be redisplayed as a small poster image on the right side of the screen and other poster images move rightward to successively different positions including into the center position of the large poster image. As a result, the user's position within the list of movies appears to move leftward.

Figure 8:
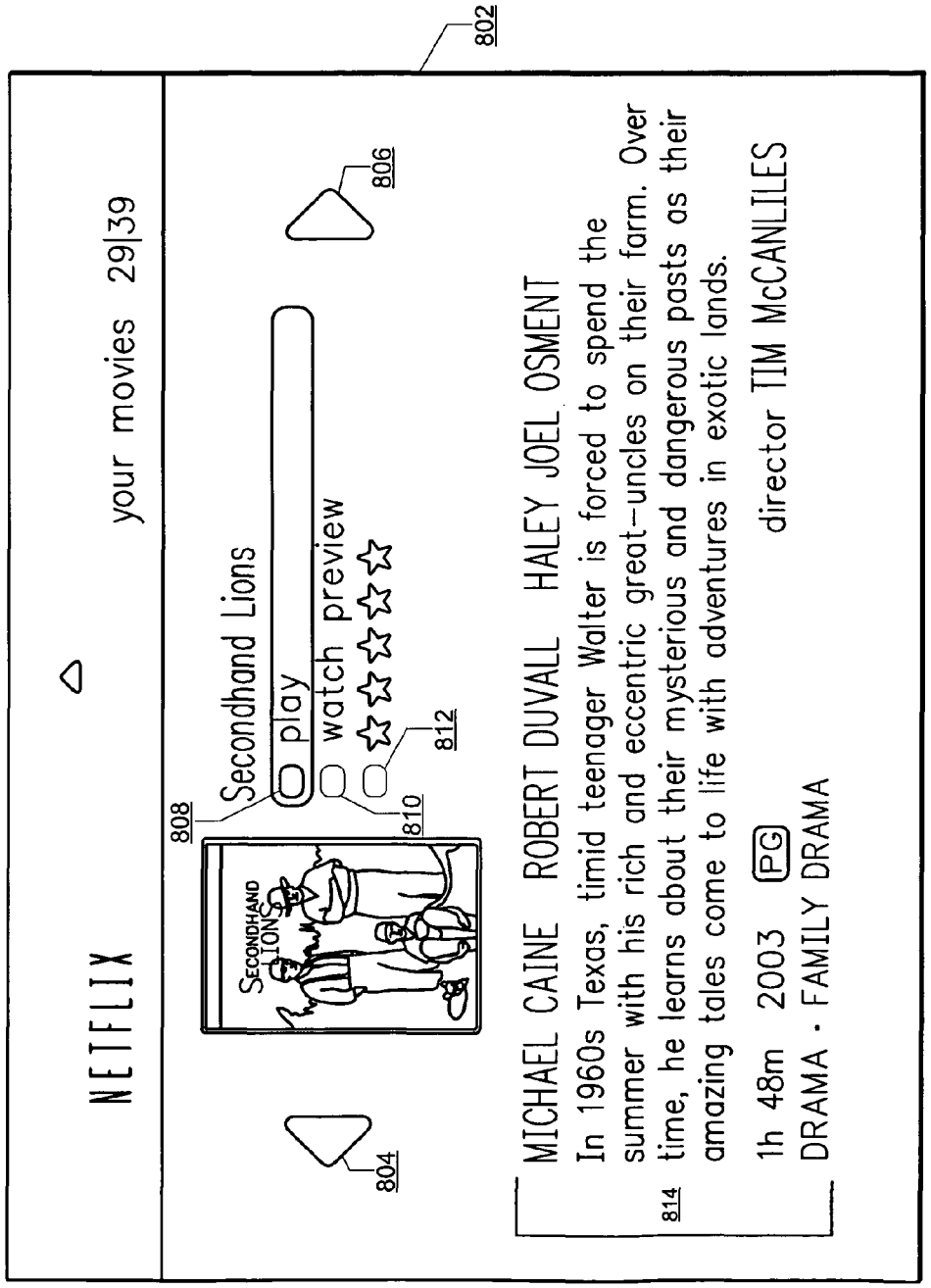
FIG. 8 illustrates a springboard screen relating to the last title in the set as shown in FIG. 7.

FIG. 8 illustrates a springboard screen relating to the last title in the set as shown in FIG. 7. In an embodiment, streaming media processor 140 displays a springboard screen 802 in response to a user pressing a selection button while a movie poster image is displayed in the center large poster image position of FIG. 5, FIG. 6, FIG. 7. Springboard screen 802 comprises a left movement icon 804 and right movement icon 806 which, when selected, cause the springboard screen to display information about movies that are before or after, in the user's list of available movies, as compared to the currently selected movie.

In an embodiment, screen 802 comprises a poster image 520A of the selected movie, metadata 814, and functional options such as a Play option 808, Watch Preview option 810, and rating option 812. Metadata 814 comprises information about the selected movie such as stars, plot summary, rating, running time, year of release, genre, director, etc. When Play option 808 is selected, streaming media processor 140 initiates streaming media play of the selected movie by requesting and downloading a streaming media file for the movie in cooperation with streaming media logic 106 or other elements of media delivery system 102 or media selection service 108. Selecting the Watch Preview option 810 causes the streaming media processor to download and display using a streaming media protocol a preview associated with the selected movie. In various embodiments, the preview may be downloaded in real time in response to selection of the option 810, or may be downloaded at the time that the streaming media processor 140 starts operating.

Rating option 812 enables a user to enter a star rating for the selected movie. In response to receiving user input specifying a star rating, the streaming media processor 140 sends information identifying the movie and the rating value to the media selection service 108, which stores the rating information in database server 112 in association with the user account 114. In this approach, a user can use a set-top box in the form of processor 140 to enter movie ratings that are later used by media selection service 108, for example, to provide recommendations of movies to the user through computer 150.

In an embodiment, if a program has been partially viewed by a user, either the media delivery system 102 and/or the streaming media processor 140 is capable of storing the location in the program (i.e., a "bookmark") where play was stopped. When a user revisits the partially watched program, springboard screen 802 may offer an action to resume viewing at, or near, the point that viewing was previously stopped. In one embodiment, a program that has been viewed substantially to the end (e.g., within 3 minutes, or 90% of the end— where credits typically run) is treated as having been completely viewed.

A bookmark may be stored at the media delivery system 102 or at viewing location 130. Thus, a bookmark may be used by more than one streaming media processor 140 for the same program. For example, play can be abandoned on one media processor (for example, in the living room) and then seamlessly restarted on a different media processor (for example, in the den). Additionally, multiple users viewing the same program can each store separate bookmarks. For example, different family members viewing the same program on different media processors can separately stop and resume play at different points in the program. In one embodiment, when there is more than one bookmark associated with a program, media processor 140 causes the display of a screen that prompts the user to select one of the bookmarked locations at which to resume play.

3.2 User Interface for Selecting Episodes of a Series

Figure 11:
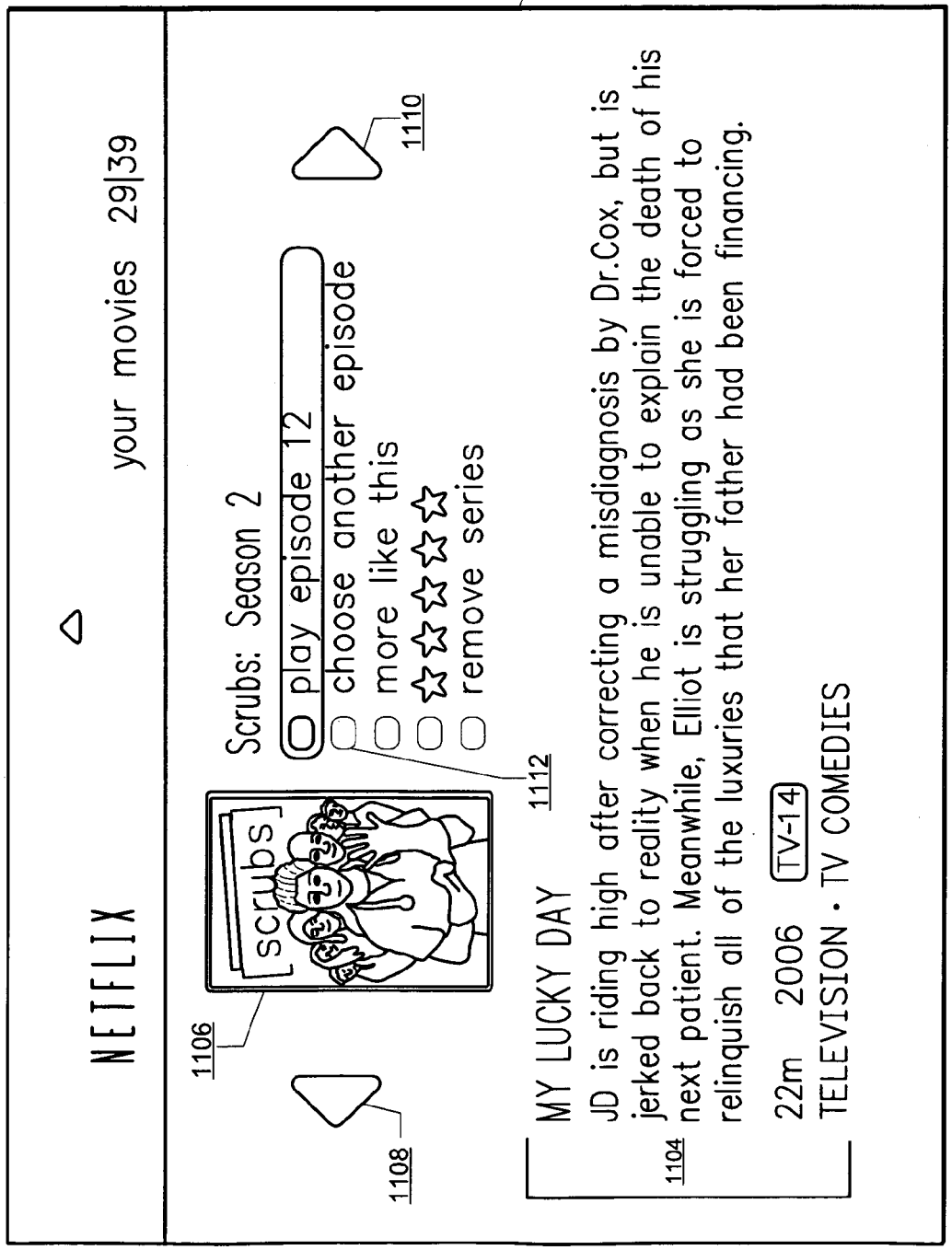
FIG. 11 illustrates a springboard screen relating to an episode among a plurality of episodes in a series program.
Figure 12:
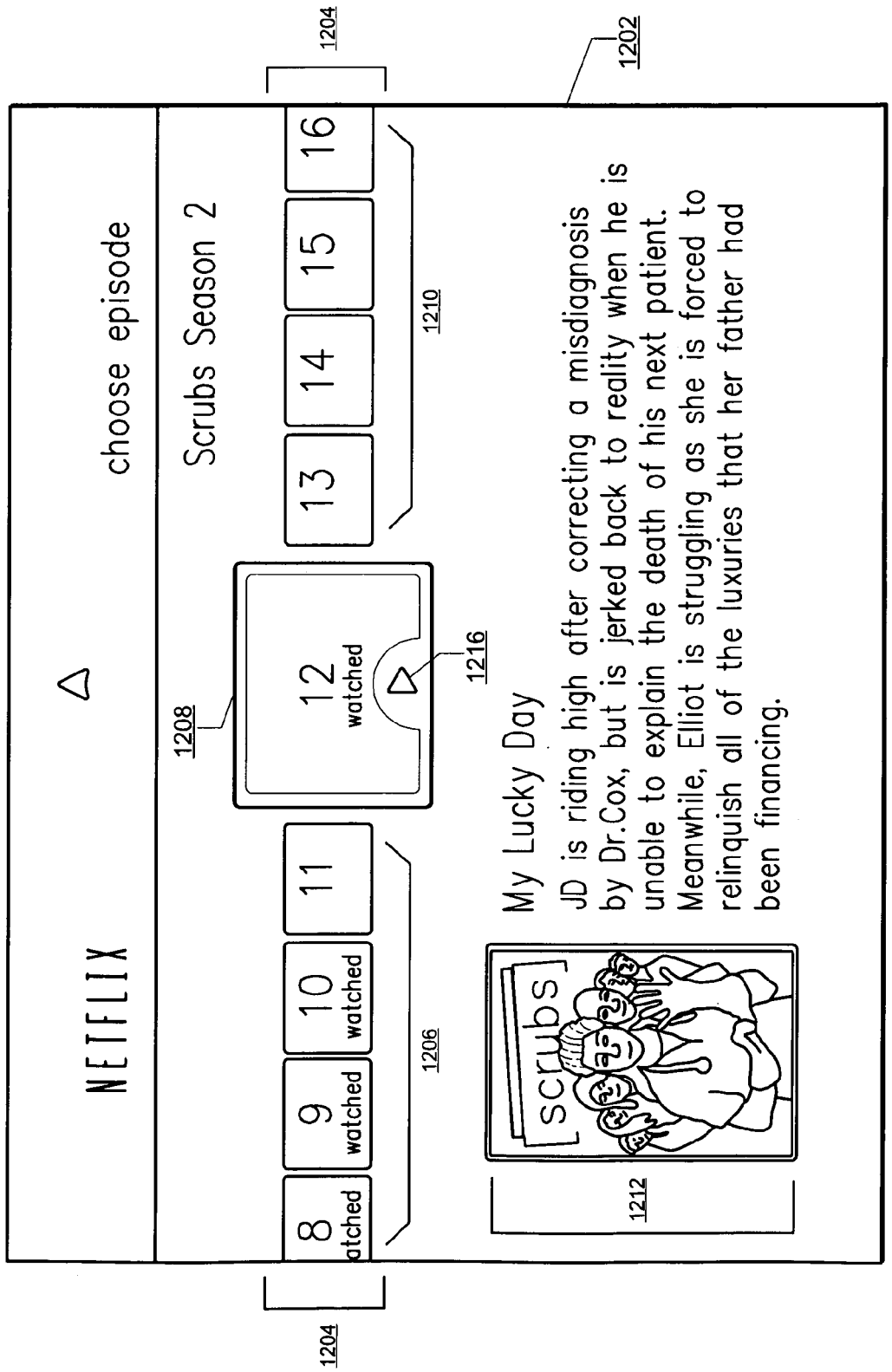
FIG. 12 illustrates choosing an episode among a plurality of episodes associated with a series.

FIG. 11 illustrates a springboard screen relating to an episode among a plurality of episodes in a series program. FIG. 12 illustrates choosing an episode among a plurality of episodes associated with a series. Referring first to FIG. 11, in an embodiment, a springboard screen 1102 for a series television program comprises metadata 1104 describing a particular selected episode, a poster image 1106 of the currently selected episode, and movement icons 1108, 1110. The left movement icon 1108 and right movement icon 1110, when selected, cause the springboard screen to display information about episodes of the same program that are before or after, in the user's list of available episodes, as compared to the currently selected episode.

In an embodiment, the springboard screen 1102 is displayed in response to a user selecting a particular season of a series program, from among a plurality of available seasons, using a poster screen interface such as that of FIG. 5, FIG. 6, FIG. 7, except that poster images for seasons are displayed rather than poster images for movies.

The "Play episode 12" option indicates that the media processor 140 knows that the user already viewed episodes 1 to 11 and has automatically selected episode 12 as the next episode to be viewed. To facilitate this function, database server 112 or other elements of media delivery system 102 or media selection system 108 may store a series bookmark for the user that indicates which episode was last watched by the user among all episodes of a season of a series. The database server 112 also may store bookmarks indicating the point at which a user stopped watching a particular episode, movie, or other audiovisual program 107A, so that later uses of processor 140 can resume playback of a program at the correct point.

Screen display 1102 further comprises a "Choose another episode" option 1112. When selected, option 1112 causes streaming media processor to generate the display of FIG. 12. In FIG. 12, a screen display 1202 comprises an ordered list

1204 of icons representing episodes in a program series. Numbers on icons in list 1204 indicate episode numbers or ordinal positions of episodes in a program series.

One or more of the icons are displayed in a left portion of the list 1204 as indicated by icons 1206. One icon 1208 representing a currently selected episode is displayed in a center position of the list 1204 and is given more prominence as a visual cue that it is the currently selected episode. In various embodiments, icon 1208 is displayed in larger form, is highlighted, brightened in comparison to other icons that are grayed out, etc. Alternatively, icon 1208 may be displayed within or with a progress bar that indicates how much of the episode has been watched. List 1204 further comprises one or more other icons 1210 representing episodes later in order than the currently selected episode of icon 1216 and are displayed in the right side of the list.

Each of the icons 1206, 1208, 1210 may comprise a marking indicating whether the user has previously watched the associated episode. For example, in FIG. 12, episodes number 8, 9, 10, and 12 have been watched and bear a "watched" marking. Markings other than words may be used such as highlighted, graying out, coloring, icons, symbols, etc. In an embodiment, when any part of a particular episode has been watched, in successive displays of screen display 1202 the icon for that episode is shown grayed out or otherwise highlighted. In an embodiment, if an episode has been partially viewed, the user may be offered a choice of resuming play at or near the point where play previously left off.

In an embodiment, icon 1208 comprises a play selection icon 1216 which, when selected, causes the streaming media processor 140 to begin playing the selected episode shown by icon 1208, by requesting and playing a media file for the selected episode using a streaming media protocol. The processor 140 may interact with streaming media logic 106 to download and play the streaming media for the episode.

In an embodiment, selecting a left movement button or right movement button on input device 144 causes the list 1204 to be redisplayed so that the position of the currently selected episode indicated by icon 1208 appears to move leftward or rightward in the list. For example, selecting a leftward movement button causes icon 11 to move rightward into the position of the currently selected episode; icon 12 moves rightward into the position occupied by icon 13 in FIG. 12; icons 13 to 15 each move one position to the right, and icon 16 is removed from the display. Similarly, icons 8-10 each move rightward one position and a new icon 7 is displayed in the leftmost position. Through this approach, the entire list 1204 appears to scroll to the right and the user's position appears to move one episode to the left. Further, the next episode to the left (icon 11 in this case) is displayed in more prominent form, such as in a larger size, to indicate that it is the currently selected episode.

Concurrently, the streaming media processor 140 downloads and displays metadata corresponding to the new currently selected episode and displays that new information as metadata 1212.

4.0 Hardware Overview

Figure 13:
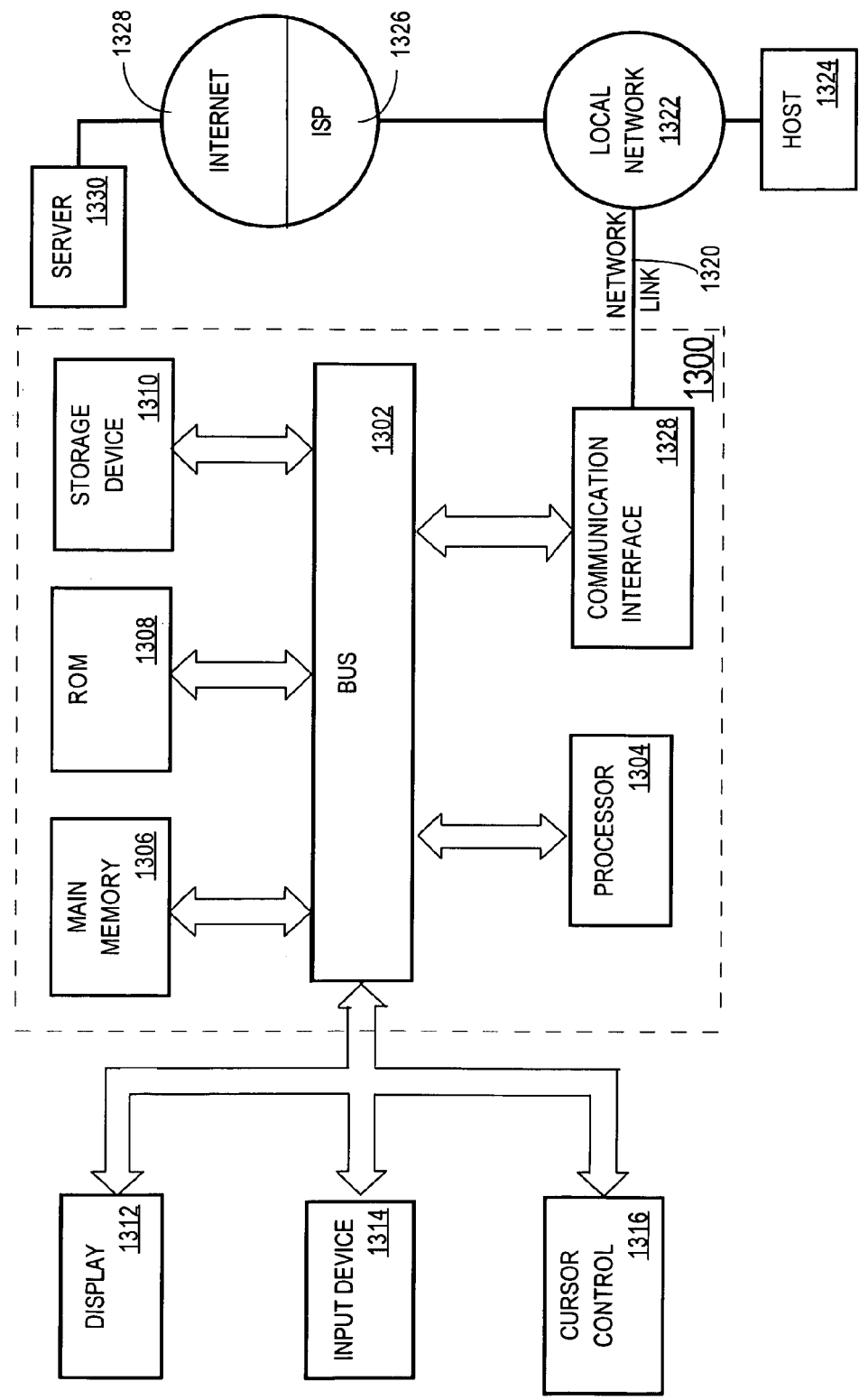
FIG. 13 is a block diagram of a computer system that may be used in an embodiment.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for implementing the techniques described herein. According to one embodiment of the invention, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1300, various machine-readable media are involved, for example, in providing instructions to processor 1304 for execution. Such a medium may take many forms, including but not limited to storage media and transmission media. Storage media includes both non-volatile media and volatile media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution. In this manner, computer system 1300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system to simulate video output of a requested trick play mode, the data processing system comprising:
 a network interface configured to couple to a data network;
 one or more processors coupled to the network interface;
 memory coupled to the one or more processors;
 a video interface coupled to the one or more processors and configured to output video data to a video display device; and
 one or more computer-readable media that include instructions that, when executed by the one or more processors, cause:
  receiving and storing in the memory a plurality of different still images from an audiovisual program, wherein each of the still images is associated with a distinct time point within the audiovisual program;
  receiving, during normal playback of the audiovisual program, a first user input requesting invocation of a trick play mode of playing the audiovisual program, wherein normal playback of the audiovisual program comprises generating video output based on the audiovisual program, wherein the requested trick play mode comprises one of fast-forward playback and reverse playback of the audiovisual program; and
  responsive to the first user input, generating, based on the still images, a video output sequence that simulates video output of the requested trick play mode.

2. The data processing system of claim 1, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, and wherein the instructions are further operable to generate updated video output to the video interface in which the still image of the second image position is shifted into the third image position, the still image of the first image position is shifted into the second image position, and a new still image appears in the first image position.

3. The data processing system of claim 1, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, and wherein the instructions are further operable to select a new still image for the third image position of the updated video output by skipping over one or more of the still images that have been received and stored.

4. The data processing system of claim 1, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, wherein the first user input specifies a particular movement speed among a plurality of movement speeds, wherein the instructions are further operable to select a new still image for the third image position of the updated video output by skipping over one or more of the still images that have been received and stored, and wherein the skipping is performed at a rate proportional to the particular movement speed.

5. The data processing system of claim 1, wherein the instructions are further operable to cause requesting the plurality of still images from a streaming media delivery system in response to receiving user input that selects an audiovisual program from among a plurality of available audiovisual programs.

6. The data processing system of claim 1, wherein the instructions are further operable to perform receiving and storing in the memory the plurality of still images in a first file and receiving and storing in the memory at least a portion of a streaming file representing the audiovisual program.

7. The data processing system of claim 1, wherein the instructions are further operable to perform the receiving and storing the plurality of still images in response to receiving user input that selects the audiovisual program from among a plurality of available audiovisual programs that are displayed in a list.

8. The data processing system of claim 1, wherein the first user input corresponds to selecting and dragging a slider of a media player application.

9. The data processing system of claim 1, wherein normal playback of the audiovisual program comprises generating, based on the audiovisual program, video output at a predefined playback rate and in a predefined playback direction, wherein faster playback comprises generating video output at a playback rate faster than the predefined playback rate of normal playback, and wherein reverse playback comprises generating video output in a playback direction opposite of the predefined playback direction of normal playback.

10. The data processing system of claim 9, where the video output sequence is generated without generating the video output of the requested trick play mode based on the audiovisual program, wherein the video output sequence is not generated directly based on the audiovisual program responsive to the first user input, and wherein the video output of the requested trick play mode is not generated based on the still images, wherein the video output sequence is generated to avoid processing costs associated with generating the video output of the requested trick play mode.

11. The data processing system of claim 10, wherein generating the video output sequence comprises:
   generating video output to the video interface that comprises a first image position comprising a first of the still images, a second image position comprising a second of the still images, and a third image position comprising a third of still images, wherein each still image in the generated video output to the video interface is different; and
   generating updated video output to the video interface, in which the still image of the second image position is shifted into the first image position, the still image of the third image position is shifted into the second image position, and a new still image appears in the third image position, thereby simulating video output of the requested trick play mode at each of the first, second, and third image positions.

12. The data processing system of claim 11, wherein the still image included in the second image position is more prominently conveyed than the still images included in the first image position and the third image position, respectively, wherein the still images in each of the first, second, and third image positions are arranged substantially linearly along a common line, and wherein the still images in the video output to the video interface are arranged in the first, second, and third image positions in sequential order according to the time points within the audiovisual program.

13. The data processing system of claim 12, wherein the instructions are further operable to, responsive to a second user input requesting invocation of a trick play mode of playing the audiovisual program, the trick play mode comprising a second one of faster playback and reverse playback of the audiovisual program, different from that which is requested in the first user input, generate updated video output to the video interface in which the still image of the second image position is shifted into the third image position, the still image of the first image position is shifted into the second image position, and a new still image appears in the first image position.

14. The data processing system of claim 13, wherein the first user input specifies a particular movement speed among a plurality of movement speeds, wherein the instructions are further operable to select the new still image for the third image position of the updated video output by skipping over one or more of the still images that have been received and stored, and wherein the skipping is performed at a rate proportional to the particular movement speed.

15. The data processing system of claim 14, wherein the instructions are further operable to cause requesting the plurality of still images from a streaming media delivery system in response to receiving user input that selects an audiovisual program from among a plurality of available audiovisual programs, and wherein the instructions are further operable to perform receiving and storing in the memory the plurality of still images in a first file and receiving and storing in the memory at least a portion of a streaming file representing the audiovisual program, wherein the streaming file is stored independently of the second file.

16. A non-transitory machine-readable medium to simulate video output of a requested trick play mode, the non-transitory machine-readable medium comprising one or more sequences of instructions which when executed by one or more processors cause the one or more processors to perform:
   receiving and storing in a memory a plurality of different still images from an audiovisual program, wherein each of the still images is associated with a distinct time point within the audiovisual program;
   receiving, during normal playback of the audiovisual program, a first user input requesting invocation of a trick play mode of playing the audiovisual program, wherein normal playback of the audiovisual program comprises generating video output based on the audiovisual program, wherein the requested trick play mode comprises one of fast-forward playback and reverse playback of the audiovisual program; and
   responsive to the first user input and by operation of the one or more processors when executing the instructions, generating, based on the still images, a video output sequence that simulates video output of the requested trick play mode.

17. The non-transitory machine-readable medium of claim 16, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, and wherein the non-transitory machine-readable medium further comprises instructions which when executed cause generating updated video output in which the still image of the second image position is shifted into the third image position, the still image of the first image position is shifted into the second image position, and a new still image appears in the first image position.

18. The non-transitory machine-readable medium of claim 16, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, and wherein the non-transitory machine-readable medium further comprises instructions which when executed cause selecting a new still image for the third image position of the updated video output by skipping over one or more of the still images that have been received and stored.

19. The non-transitory machine-readable medium of claim 16, wherein generating the video output sequence comprises generating video output to the video interface that comprises a first image position comprising a first of the still images, a second image position comprising a second of the still images, and a third image position comprising a third of still images, wherein each still image in the generated video output to the video interface is different, wherein the first user input specifies a particular movement speed among a plurality of movement speeds, wherein the non-transitory machine-readable medium further comprises instructions which when executed cause selecting a new still image for the third image position of the updated video output by skipping over one or more of the still images that have been received and stored, and wherein the skipping is performed at a rate proportional to the particular movement speed.

20. The non-transitory machine-readable medium of claim 16, further comprising instructions which when executed cause requesting the plurality of still images from a streaming media delivery system in response to receiving user input that selects an audiovisual program from among a plurality of available audiovisual programs.

21. The non-transitory machine-readable medium of claim 16, further comprising instructions which when executed cause receiving and storing in the memory the plurality of still images in a first file and receiving and storing in the memory at least a portion of a streaming file representing the audiovisual program.

22. The non-transitory machine-readable medium of claim 16, further comprising instructions which when executed cause performing the receiving and storing the plurality of still images in response to receiving user input that selects the audiovisual program from among a plurality of available audiovisual programs that are displayed in a list.

23. The non-transitory machine-readable medium of claim 16, wherein the first user input corresponds to selecting and dragging a slider of a media player application.

24. A data processing system to simulate video output of a requested trick play mode, the data processing system comprising:
  a network interface configured to couple to a data network;
  one or more processors coupled to the network interface;
  memory coupled to the one or more processors;
  a video interface coupled to the one or more processors and configured to output video data to a video display device; and
  one or more computer-readable media that include instructions that, when executed by the one or more processors, causes:
    responsive to user selection of an audiovisual program that comprises a plurality of different episodes, generating video output to the video interface, wherein the video output comprises a set of different icons arranged substantially linearly along a common line representing a plurality of the episodes in a sequential order, and wherein a particular icon representing a particular episode that was most recently watched is conveyed more prominently than each of the other icons in the set of icons, and
    responsive to a user request, during normal playback of a selected episode of the plurality of episodes of the selected audiovisual program, to invoke a trick play mode of playing the selected episode, generating, based on a plurality of still images previously stored from the selected episode, a video output sequence that simulates video output of the requested trick play mode, wherein normal playback of the audiovisual program comprises generating video output based on the audiovisual program, wherein the requested trick play mode comprises one of fast-forward playback and reverse playback of the audiovisual program.

25. The data processing system of claim 24, wherein each icon that is associated with a previously watched episode comprises a marking indicating that the episode was watched.

26. The data processing system of claim 24, wherein the particular icon further comprises an operation icon representing a playback operation and which when selected causes requesting, receiving and displaying streaming video data of the particular episode.

27. The data processing system of claim 24, wherein the sequential order is an order in which the episodes originally aired.

28. The data processing system of claim 24, wherein the instructions are further operable to perform:
  generating the video output to the video interface wherein the video output comprises a first image position comprising one or more of the icons, a second image position comprising the particular icon, and a third image position comprising one or more of the icons, wherein the icons in each of the first, second, and third image positions are arranged linearly along the common line;
  receiving user input specifying selection of a different icon representing a different episode of the selected audiovisual program, that is later in the order than the particular episode that was most recently watched; and
  generating updated video output to the video interface in which the particular icon is shifted into the first position, one of the icons of the third position is shifted into the second position, and one or more icons representing different episodes that are later in the order are in the third image position.

29. The data processing system of claim 24, wherein the instructions are further operable to perform:
  generating the video output to the video interface wherein the video output comprises a first image position comprising one or more of the icons, a second image position comprising the particular icon, and a third image position comprising one or more of the icons, wherein the icons in each of the first, second, and third image positions are arranged linearly along the common line;
  receiving user input specifying selection of a different icon representing a different episode that is earlier in the order than the particular episode that was most recently watched; and
  generating updated video output to the video interface in which the particular icon is shifted into the third position, one of the icons of the first position is shifted into the second position, and one or more icons representing different episodes that are earlier in the order appear in the first image position.

30. The system of claim 24, wherein the instructions are further operable to perform generating the video output further including a textual summary of the particular episode associated with the particular icon.

31. A non-transitory computer-readable medium to simulate video output of a requested trick play mode, the non-transitory computer-readable medium comprising one or more sequences of instructions which when executed by one or more processors cause the one or more processors to perform:

responsive to user selection of an audiovisual program that comprises a plurality of different episodes, generating video output to the video interface, wherein the video output comprises a set of different icons arranged substantially linearly along a common line representing a plurality of the episodes in a sequential order, and wherein a particular icon representing a particular episode that was most recently watched is conveyed more prominently than each of the other icons in the set of icons; and responsive to a user request, during normal playback of a selected episode of the plurality of episodes of the selected audiovisual program, to invoke a trick play mode of playing the selected episode, generating, based on a plurality of still images previously stored from the selected episode, a video output sequence that simulates video output of the requested trick play mode, wherein normal playback of the audiovisual program comprises generating video output based on the audiovisual program, wherein the requested trick play mode comprises one of fast-forward playback and reverse playback of the audiovisual program.

\* \* \* \* \*

UNITED STATES PATENT AND TRADEMARK OFFICE
CERTIFICATE OF CORRECTION

PATENT NO. : 8,365,235 B2  
APPLICATION NO. : 12/205118  
DATED : January 29, 2013  
INVENTOR(S) : Hunt et al.

It is certified that error appears in the above-identified patent and that said Letters Patent is hereby corrected as shown below:

In the Claims:

Column 23, Claim 9, Line 26, please delete "faster" and insert --fast-forward-- therefor;

Column 24, Claim 13, Line 5, please delete "faster" and insert --fast-forward-- therefor.

Signed and Sealed this
Twenty-first Day of May, 2013

Teresa Stanek Rea
*Acting Director of the United States Patent and Trademark Office*